United States Patent
Sun et al.

(10) Patent No.: US 11,240,213 B2
(45) Date of Patent: Feb. 1, 2022

(54) RESOURCE OBTAINING, DISTRIBUTION, AND DOWNLOAD METHOD AND APPARATUS, DEVICE, AND STORAGE MEDIUM

(71) Applicant: Huawei Technologies Co., Ltd., Shenzhen (CN)

(72) Inventors: Yishan Sun, Shenzhen (CN); Lei Yuan, Beijing (CN); Jiawei Zhou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/987,826

(22) Filed: Aug. 7, 2020

(65) Prior Publication Data

US 2020/0366655 A1 Nov. 19, 2020

Related U.S. Application Data

(63) Continuation of application No. PCT/CN2019/080920, filed on Apr. 2, 2019.

(30) Foreign Application Priority Data

Jun. 11, 2018 (CN) .......................... 201810594990.4

(51) Int. Cl.
*H04L 29/06* (2006.01)
*H04L 12/911* (2013.01)
*H04L 29/08* (2006.01)

(52) U.S. Cl.
CPC .......... *H04L 63/0442* (2013.01); *H04L 47/82* (2013.01); *H04L 63/0807* (2013.01); *H04L 63/0823* (2013.01); *H04L 67/104* (2013.01)

(58) Field of Classification Search
CPC . H04L 63/0442; H04L 47/82; H04L 63/0807; H04L 63/0823; H04L 67/104; H04L 9/0894; H04L 9/3247; H04L 9/3213; H04L 9/3263; H04L 67/06; H04L 63/02; H04L 63/08
See application file for complete search history.

(56) References Cited

U.S. PATENT DOCUMENTS

| | | | |
|---|---|---|---|
| 2002/0107803 A1 | 8/2002 | Lisanke et al. | |
| 2003/0233541 A1* | 12/2003 | Fowler | H04L 63/0823 713/155 |
| 2006/0174120 A1 | 8/2006 | Rippy et al. | |
| 2008/0046758 A1* | 2/2008 | Cha | G06F 21/10 713/189 |
| 2009/0210697 A1 | 8/2009 | Chen et al. | |

(Continued)

FOREIGN PATENT DOCUMENTS

| | | |
|---|---|---|
| CN | 1703749 A | 11/2005 |
| CN | 1925388 A | 3/2007 |

(Continued)

*Primary Examiner* — Michael Won
(74) *Attorney, Agent, or Firm* — Conley Rose, P.C.

(57) ABSTRACT

A resource distribution method, when different peer nodes communicate with each other, a key pair is used for encryption. A resource is transmitted in a ciphertext form in a peer-to-peer (P2P) network. In particular, each resource may have a corresponding key pair, and different key pairs may be used to encrypt resources of different users.

20 Claims, 17 Drawing Sheets

(56) References Cited

U.S. PATENT DOCUMENTS

| | | | |
|---|---|---|---|
| 2010/0008509 A1 | 1/2010 | Matsushita et al. | |
| 2011/0038483 A1 | 2/2011 | Goeller et al. | |
| 2014/0096215 A1* | 4/2014 | Hessler | H04W 12/06 726/7 |
| 2014/0122608 A1 | 5/2014 | Liu et al. | |
| 2014/0164776 A1* | 6/2014 | Hook | G06F 21/6218 713/171 |
| 2015/0093029 A1* | 4/2015 | Tijssen | G06T 11/00 382/173 |
| 2015/0326633 A1 | 11/2015 | Chang et al. | |
| 2016/0080813 A1 | 3/2016 | Barton et al. | |
| 2019/0109713 A1* | 4/2019 | Clark | H04L 9/3239 |
| 2020/0045016 A1* | 2/2020 | Chor | H04L 63/0428 |
| 2020/0313902 A1* | 10/2020 | Yu | H04L 9/3239 |

FOREIGN PATENT DOCUMENTS

| | | |
|---|---|---|
| CN | 101064695 A | 10/2007 |
| CN | 101222509 A | 7/2008 |
| CN | 101297278 A | 10/2008 |
| CN | 101471771 A | 7/2009 |
| CN | 101471772 A | 7/2009 |
| CN | 101917488 A | 12/2010 |
| CN | 102202239 A | 9/2011 |
| CN | 103237011 A | 8/2013 |
| CN | 103297484 A | 9/2013 |
| CN | 104717304 A | 6/2015 |
| CN | 105099946 A | 11/2015 |
| CN | 108683747 A | 10/2018 |

\* cited by examiner

```
{
    "header": {
        "public_key": "XXXX"
    },
    "body": {
        "resource": "domain/namespace/repo",
        "access": [
            "pull",
            "push"
        ]
    },
    "sign": "sign_with_body_and_timestamp"
}
```

FIG. 7

RESOURCE OBTAINING, DISTRIBUTION, AND DOWNLOAD METHOD AND APPARATUS, DEVICE, AND STORAGE MEDIUM

CROSS-REFERENCE TO RELATED APPLICATIONS

This application is a continuation of International Patent Application No. PCT/CN2019/080920 filed on Apr. 2, 2019, which claims priority to Chinese Patent Application No. 201810594990.4 filed on Jun. 11, 2018. The disclosures of the aforementioned applications are hereby incorporated by reference in their entireties.

TECHNICAL FIELD

This application relates to the field of network technologies, and in particular, to a resource obtaining, distribution, and download method and apparatus, a device, and a storage medium.

BACKGROUND

A peer-to-peer (P2P) network is a network architecture mainly formed by a large quantity of peer nodes (peer). Different peers are in a P2P relationship and may transmit a resource to each other. In a resource transmission process, each peer obtains a required resource from another peer, in the P2P network, having the resource, and distributes a downloaded resource to each peer, in the P2P network, needing the resource. This greatly improves resource transmission efficiency in a network. A larger quantity of downloaders of each resource indicates a higher speed of downloading the resource.

For a specific resource transmission process between any two peers, that a resource downloader is a peer A and a resource provider is a peer B is used as an example. First, the peer A performs a Transmission Control Protocol (TCP) three-way handshake with the peer B to establish a TCP connection. Then, the peer A performs a P2P handshake with the peer B through the TCP connection based on a peer wire protocol. After that, the peer A and the peer B exchange their bitmaps (Pieces bit map). The bitmap is used to indicate resource pieces that have been downloaded by a corresponding peer. After the bitmaps are exchanged, the peer A may determine a resource piece that needs to be downloaded from the peer B, and send an obtaining request (namely, a request message) to the peer B. The obtaining request is used to request a required resource piece. After receiving the obtaining request, the peer B sends the resource piece to the peer A, and the peer A receives the resource piece. In this way, the peer A obtains one resource piece. Further, the peer A may communicate in parallel, in a same manner, with each peer that downloads another resource piece, receive the resource piece sent by each peer, and finally obtain a complete resource by joining all resource pieces of the resource.

However, there is the following problem.

Currently, there is no authentication mechanism in the P2P network, and it is difficult to ensure security of resource transmission in the P2P network.

SUMMARY

Embodiments of this application provide a resource obtaining, distribution, download method and apparatus, a device, and a storage medium, to resolve a problem of relatively poor security of resource transmission in a related technology. The technical solutions are as follows.

According to a first aspect, a resource obtaining method is provided. The method includes receiving, by a first node, a first data packet from one second node or first data packets from more second nodes, where the one or more first data packets are obtained after a resource piece of a target resource is encrypted using a public key in a key pair, the key pair is used to encrypt the target resource between the first node and the one or more second nodes in a P2P network, and the key pair includes the public key and a private key, decrypting, by the first node, the one or more first data packets using the private key, to obtain one or more resource pieces of the target resource, and determining, by the first node, the target resource based on the one or more resource pieces.

The method provided in this embodiment introduces an authentication mechanism to the P2P network. When different peer nodes communicate with each other, the key pair is used for encryption. A peer node that has a resource may use the public key in the key pair to encrypt the resource, and then send the encrypted resource to another peer node. A peer node that requests the resource may use the private key in the key pair to decrypt the encrypted resource, and convert the resource from a ciphertext to a plaintext. This can avoid a security risk caused by stealing of the resource during resource transmission in the P2P network, to greatly improve security of the P2P network. In addition, each resource may have a corresponding key pair, and different key pairs may be used to encrypt resources of different users. Therefore, this ensures that any user cannot decrypt a resource of another user using a key of the user and cannot access the resource of the other user. This implements mutual isolation of resources of different users. In particular, when being applied to an image distribution service in a public cloud, the foregoing may be provided as a solution of securely distributing an image based on the P2P network, to ensure tenant isolation of the public cloud.

Optionally, the key pair is used to encrypt one or more links for transmitting the target resource in the P2P network, and the one or more links are links between the first node and the one or more second nodes.

For any link between the first node and the one or more second nodes, when the first node receives any data packet over the link, the first node decrypts the data packet using the private key.

According to this link encryption manner, it may be considered that an encryption channel is established between the first node and the second node for the target resource. The first node and the second node encrypt and/or decrypt a data packet including content of the target resource, and encrypt and/or decrypt another data packet related to the target resource. For example, before the target resource is transmitted, an obtaining request, for the target resource, exchanged between the first node and the second node, and some other communication messages and control signaling are also transmitted in a ciphertext form over the link. This greatly improves security of resource transmission between different peer nodes.

Optionally, before receiving a first data packet from one second node or first data packets from more second nodes, the method further includes for any one of the one or more second nodes, generating, by the first node, an obtaining request for the target resource, encrypting, by the first node, the obtaining request using the public key, to obtain a second data packet, and sending, by the first node, the second data packet to the second node.

Optionally, the method further includes obtaining, by the first node, a key pair corresponding to the target resource.

Optionally, obtaining, by the first node, a key pair corresponding to the target resource includes receiving, by the first node, a key pair of a tracking node in the P2P network, or receiving, by the first node, a digital certificate of a tracking node in the P2P network, where the digital certificate carries an identifier of the target resource, and generating a key pair based on the digital certificate.

Optionally, before obtaining, by the first node, a key pair corresponding to the target resource, the method further includes sending, by the first node, token data of an authentication node to the tracking node, where the token data is used to indicate that the first node has a permission to obtain the target resource.

Optionally, before receiving, by a first node, a first data packet from one second node or first data packets from more second nodes, the method further includes sending, by the first node, token data of an authentication node to the one or more second nodes, where the token data is used to indicate that the first node has a permission to obtain the target resource.

In this implementation, permission is confirmed between peer nodes. Only when determining, based on the token data from the first node, that the first node has the permission to obtain the target resource, the second node returns the target resource to the first node. Otherwise, the second node rejects returning the target resource to the first node. This avoids a case in which the peer node obtains a resource that the peer node does not have a permission to obtain.

Optionally, the token data includes at least one permission identifier. The at least one permission identifier is used to indicate at least one permission of the first node on the target resource. The at least one permission includes the permission for obtaining the target resource.

Optionally, sending token data of an authentication node includes adding, by the first node, a digital signature to the token data using the private key, to obtain a third data packet, and sending, by the first node, the third data packet.

Optionally, the target resource is an image layer.

Optionally, the target resource is divided into one or more first resource pieces, and each first resource piece is divided into one or more second resource pieces.

The method further includes in a download process, for any first resource piece in the target resource, downloading, by the first node, one or more second resource pieces in the first resource piece according to a bit torrent (BT) rule, when finishing downloading the one or more second resource pieces, sending, by the first node, the one or more second resource pieces to a service processing module in turn according to an arrangement sequence of the one or more second resource pieces in the target resource, and continuing, by the first node, to download a next first resource piece of the first resource piece in the target resource until the target resource is completely downloaded.

Optionally, the method further includes sending, by the first node, infrastructure as a service (IaaS) feature information, of the first node, in a cloud computing service to a tracking node in the P2P network, receiving, by the first node, peer node information of the P2P network from the tracking node, where the peer node information includes one or more node identifiers, and one or more priorities of the one or more node identifiers in the peer node information corresponds or correspond to a matching degree between a corresponding node and the IaaS feature information of the first node, selecting, by the first node, one or more second nodes in the P2P network based on the peer node information, and downloading, by the first node, the target resource from the selected one or more second nodes.

Optionally, selecting, by the first node, one or more second nodes in the P2P network based on the peer node information includes determining, by the first node, a first type of node as the one or more second nodes based on the peer node information, where the first type of node and the first node are located on a same host machine, and/or determining, by the first node, a second type of node as the one or more second nodes based on the peer node information, where the second type of node and the first node are located on a same rack, and/or determining, by the first node, a third type of node as the one or more second nodes based on the peer node information, where the third type of node and the first node are located in a same equipment room, and/or determining, by the first node, a fourth type of node as the one or more second nodes based on the peer node information, where the fourth type of node and the first node are located in a same region.

Optionally, an identifier, of a first type of node, in the peer node information has a first priority, and the first type of node and the first node are located on a same host machine, and/or an identifier, of a second type of node, in the peer node information has a second priority, and the second type of node and the first node are located on a same rack, and/or an identifier, of a third type of node, in the peer node information has a third priority, and the third type of node and the first node are located in a same equipment room, and/or an identifier, of a fourth type of node, in the peer node information has a fourth priority, and the fourth type of node and the first node are in a same region.

The first priority, the second priority, the third priority, and the fourth priority are used to indicate a priority of selecting the corresponding node by the first node. The first priority, the second priority, the third priority, and the fourth priority are sorted in descending order.

According to a second aspect, a resource distribution method is provided. The method includes encrypting, by a second node, a resource piece of a target resource using a public key in a key pair, to obtain a first data packet, where the key pair is used to encrypt the target resource between the second node and one or more first nodes in a P2P network, and the key pair includes the public key and a private key, and sending, by the second node, one or more first data packets to the one or more first nodes.

The method provided in this embodiment introduces an authentication mechanism to the P2P network. When different peer nodes communicate with each other, the key pair is used for encryption. A peer node that has a resource may use the public key in the key pair to encrypt the resource, and then send the encrypted resource to another peer node. A peer node that requests the resource may use the private key in the key pair to decrypt the encrypted resource, and convert the resource from a ciphertext to a plaintext. This can avoid a security risk caused by stealing of the resource during resource transmission in the P2P network, to greatly improve security of the P2P network. In addition, each resource may have a corresponding key pair, and different key pairs may be used to encrypt resources of different users. Therefore, this ensures that any user cannot decrypt a resource of another user using a key of the user and cannot access the resource of the other user. This implements mutual isolation of resources of different users. In particular, when being applied to an image distribution service in a public cloud, the foregoing may be provided as a solution of securely distributing an image based on the P2P network, to ensure tenant isolation of the public cloud.

Optionally, the key pair is used to encrypt one or more links for transmitting the target resource in the P2P network, and the one or more links are links between the second node and the one or more first nodes.

For any link between the first node and the one or more second nodes, when the second node generates any data packet that is to be transmitted over the link, the second node encrypts the data packet using the public key.

Optionally, before sending one or more first data packets, the method further includes receiving, by the second node, token data from the one or more first nodes, where the token data is used to indicate that a corresponding first node has a permission to obtain the target resource, and determining, by the second node based on one or more pieces of token data, that the one or more first nodes has or have the permission to obtain the target resource.

Optionally, the method further includes obtaining, by the second node, a key pair corresponding to the target resource.

According to a third aspect, a resource download method is provided. The method includes determining, by a first node, a target resource, where the target resource is divided into one or more first resource pieces, and each first resource piece is divided into one or more second resource pieces, in a download process, for any first resource piece in the target resource, downloading, by the first node, one or more second resource pieces in the first resource piece according to a BT rule, when finishing downloading the one or more second resource pieces, sending, by the first node, the one or more second resource pieces to a service processing module in turn according to an arrangement sequence of the one or more second resource pieces in the target resource, and continuing, by the first node, to download a next first resource piece of the first resource piece in the target resource until the target resource is completely downloaded.

However, in this embodiment of this application, all first resource pieces in the target resource are sequentially downloaded. That is, the first large piece is first downloaded, and then the second large piece is downloaded. Therefore, based on this, different second resource pieces in a same resource piece are sequentially sent to the service processing module. For example, different pieces in the large piece are sequentially sent to a DOCKER client. Then, the service processing module sequentially receives all second resource pieces. That is, a sequence of the pieces received by the service processing module is exactly an arrangement sequence of the pieces in the resource. Therefore, the service processing module processes all the received pieces in turn to ensure correctness of a service processing result.

Further, native processing logic of a P2P network is modified, and pieces are downloaded in an out-of-order manner. This can speed up overall distribution, to quickly distribute a large quantity of resources through the P2P network. In an image distribution service in a public cloud, this can resolve a problem that when a large quantity of images are distributed, an image distribution rate is low.

Further, the P2P network provided in this embodiment of this application is of a mesh structure. Different peer nodes in the P2P network may be randomly connected to each other. Any link in the mesh structure is used to bidirectionally transmit a resource. To be specific, both uplink transmission and downlink transmission of the resource may be implemented over any link in the P2P network such that a transmission advantage of a TCP duplex channel between peers may be fully utilized.

Further, a super node does not need to be disposed in the P2P network provided in this embodiment of this application. The target resource may be directly distributed from a source node to each peer node, and a deployment structure is relatively simple.

According to a fourth aspect, a resource download method is provided. The method includes sending, by a first node, IaaS feature information, of the first node, in a cloud computing service to a tracking node in a P2P network, receiving, by the first node, peer node information of the P2P network from the tracking node, where the peer node information includes one or more node identifiers, and one or more priorities of the one or more node identifiers corresponds or correspond to a matching degree between a corresponding node and the IaaS feature information of the first node, selecting, by the first node, one or more second nodes in the P2P network based on the peer node information, and downloading, by the first node, a target resource from the one or more second nodes.

According to the method provided in this embodiment, with reference to an architecture system of an equipment room in a cloud computing service, a priority rule is designed for a peer node in the P2P network. The first node preferably obtains the target resource from another peer node that is on a same host machine as the first node. Then, the first node preferably obtains the target resource from another peer node that is on a same rack as the first node. Then, the first node preferably obtains the target resource from another peer node that is in a same equipment room as the first node. Last, the first node crosses an equipment room to obtain the target resource from a peer node in another equipment room. In this way, the method may be applied to a public cloud, to obtain the target resource nearby. This ensures that a local peer node is preferably used, to minimize cross-host and cross-equipment room network traffic.

According to a fifth aspect, a resource download method is provided. The method includes receiving, by a tracking node, IaaS feature information of a first node in a P2P network, generating, by the tracking node, peer node information based on a matching degree between IaaS feature information of each node in the P2P network and the IaaS feature information of the first node, where the peer node information includes one or more node identifiers, and an arrangement sequence of the one or more node identifiers corresponds to the matching degree, and sending, by the tracking node, the peer node information to the first node.

According to the method provided in this embodiment, with reference to an architecture system of an equipment room in a cloud computing service, a priority rule is designed for a peer node in the P2P network. The first node preferably obtains a target resource from another peer node that is on a same host machine as the first node. Then, the first node preferably obtains the target resource from another peer node that is on a same rack as the first node. Then, the first node preferably obtains the target resource from another peer node that is in a same equipment room as the first node. Last, the first node crosses an equipment room to obtain the target resource from a peer node in another equipment room. In this way, the method may be applied to a public cloud, to obtain the target resource nearby. This ensures that a local peer node is preferably used, to minimize cross-host and cross-equipment room network traffic.

According to a sixth aspect, a resource obtaining apparatus is provided configured to perform the method according to the first aspect or any one of the possible implementations of the first aspect. The resource obtaining apparatus includes a function module configured to perform the method according to the first aspect or any one of the possible implementations of the first aspect.

According to a seventh aspect, a resource distribution apparatus is provided configured to perform the method according to the second aspect or any one of the possible implementations of the second aspect. Further, the resource distribution apparatus includes a function module configured to perform the method according to the second aspect or any one of the possible implementations of the second aspect.

According to an eighth aspect, a resource download apparatus is provided configured to perform the method according to the third aspect or any one of the possible implementations of the third aspect. Further, the resource download apparatus includes a function module configured to perform the method according to the third aspect or any one of the possible implementations of the third aspect.

According to a ninth aspect, a resource download apparatus is provided configured to perform the method according to the fourth aspect or any one of the possible implementations of the fourth aspect. Further, the resource download apparatus includes a function module configured to perform the method according to the fourth aspect or any one of the possible implementations of the fourth aspect.

According to a tenth aspect, a resource download apparatus is provided configured to perform the method according to the fifth aspect or any one of the possible implementations of the fifth aspect. Further, the resource download apparatus includes a function module configured to perform the method according to the fifth aspect or any one of the possible implementations of the fifth aspect.

According to an eleventh aspect, a computer device is provided. The computer device includes a processor and a memory. The memory stores at least one instruction, and the instruction is loaded and executed by the processor to implement an operation performed in the resource obtaining method according to the first aspect or any one of the possible implementations of the first aspect.

According to a twelfth aspect, a computer device is provided. The computer device includes a processor and a memory. The memory stores at least one instruction, and the instruction is loaded and executed by the processor to implement an operation performed in the resource distribution method according to the second aspect or any one of the possible implementations of the second aspect.

According to a thirteenth aspect, a computer device is provided. The computer device includes a processor and a memory. The memory stores at least one instruction, and the instruction is loaded and executed by the processor to implement an operation performed in the resource download method according to the third aspect.

According to a fourteenth aspect, a computer device is provided. The computer device includes a processor and a memory. The memory stores at least one instruction, and the instruction is loaded and executed by the processor to implement an operation performed in the resource download method according to the fourth aspect.

According to a fifteenth aspect, a computer device is provided. The computer device includes a processor and a memory. The memory stores at least one instruction, and the instruction is loaded and executed by the processor to implement an operation performed in the resource download method according to the fifth aspect.

According to a sixteenth aspect, a computer-readable storage medium is provided.

The storage medium stores at least one instruction, and the instruction is loaded and executed by the processor to implement an operation performed in the resource obtaining method according to the first aspect or any one of the possible implementations of the first aspect.

According to a seventeenth aspect, a computer-readable storage medium is provided. The storage medium stores at least one instruction, and the instruction is loaded and executed by the processor to implement an operation performed in the resource distribution method according to the second aspect or any one of the possible implementations of the second aspect.

According to an eighteenth aspect, a computer-readable storage medium is provided. The storage medium stores at least one instruction, and the instruction is loaded and executed by the processor to implement an operation performed in the resource download method according to the third aspect.

According to a nineteenth aspect, a computer-readable storage medium is provided. The storage medium stores at least one instruction, and the instruction is loaded and executed by the processor to implement an operation performed in the resource download method according to the fourth aspect.

According to a twentieth aspect, a computer-readable storage medium is provided.

The storage medium stores at least one instruction, and the instruction is loaded and executed by the processor to implement an operation performed in the resource download method according to the fifth aspect.

According to a twenty-first aspect, a chip is provided. The chip includes a processor and/or a program instruction. When the chip is run, the method according to any aspect or any one of the possible implementations of the any aspect is performed.

BRIEF DESCRIPTION OF DRAWINGS

FIG. 7 is a schematic diagram of token data according to an embodiment of this application;

DESCRIPTION OF EMBODIMENTS

Figure 1:
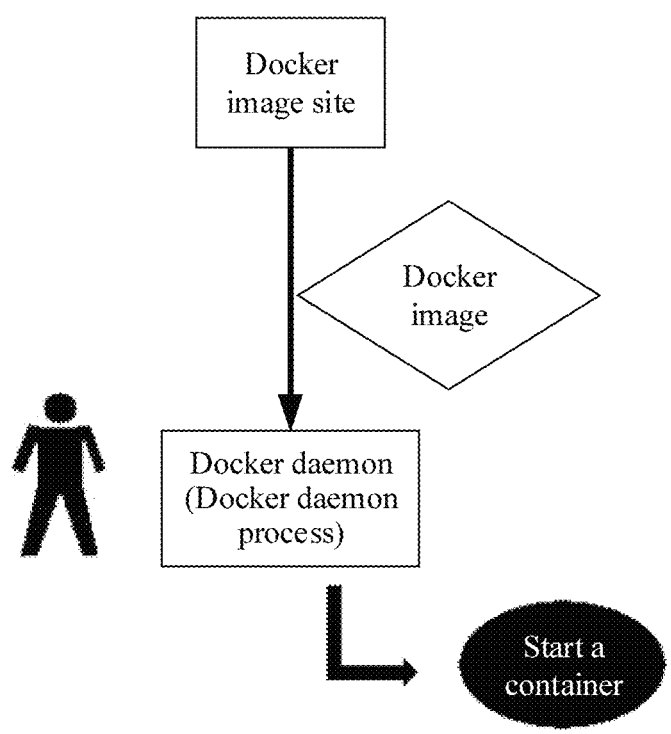
FIG. 1 is a schematic diagram of an application scenario according to an embodiment of this application.

To make the objectives, technical solutions, and advantages of this application clearer, the following further describes the implementations of this application in detail with reference to the accompanying drawings.

The following explains some technical terms in embodiments of this application.

Encryption: The encryption is a process in which an encryption algorithm is used to compute a plaintext and a key to obtain a ciphertext. With an encryption technology, original data that needs to be transmitted may be converted from the plaintext into the ciphertext and transmitted on a network in a ciphertext form, to ensure data security. Decryption: The decryption is an inverse operation of encryption, and is a process in which an encryption algorithm is used to compute a key and a ciphertext to obtain a plaintext.

Key (cipher): The key is a parameter entered when an encryption algorithm is used. In a same encryption algorithm, different ciphertexts are generated for a same plaintext using different keys. The key is an important parameter that determines security of the ciphertext.

Network layering: An Open Systems Interconnection (OSI) model is divided into seven layers from bottom to top: a physical layer, a data link layer, a network layer, a transport layer, a session layer, a presentation layer, and an application layer. In an application, a network architecture is usually simplified into five layers from bottom to top: the physical layer, the data link layer, the network layer, the transport layer, and the application layer. Due to a layered network design, tasks such as data receiving and sending, encapsulation, and decapsulation that need to be completed by each network element may be completed by different hardware and software in the network element. For example, a task that needs to be completed at the data link layer may be executed by a network adapter and BLUETOOTH in the network element. A task that needs to be completed at the application layer may be executed by a client, a process, and the like running on the network element. This simplifies an information interaction process between different network elements.

Link encryption When an encryption technology is used to encrypt data below a network layer, for example, encrypt data transmitted at a data link layer, the encryption technology is referred to as link encryption. According to a link encryption manner, it may be considered that an encryption channel is established between a sender and a receiver. Various messages transmitted between the sender and the receiver over the encryption channel are transmitted in a ciphertext form. Further, before sending a message, the sender uses a key and an encryption algorithm to encrypt data, and then sends the data to the receiver. After receiving the message, the receiver uses a key and a decryption algorithm to decrypt the data, and then obtains a plaintext. In this way, even if a third party intercepts the message over the encryption channel, the ciphertext cannot be restored to the plaintext because no key is available. This ensures confidentiality of data transmission.

The encryption algorithm and the decryption algorithm are classified into two types based on whether the key used for encryption is the same as the key used for decryption a symmetric encryption algorithm and an asymmetric encryption algorithm. According to the symmetric encryption algorithm, a same key is used for data encryption and decryption. According to the asymmetric encryption algorithm, different keys are used for data encryption and decryption. Further, a key used for encryption and a key used for decryption are two keys, and the two keys form a key pair. In the key pair, one key may be public and is referred to as a public key, and one key is secretly stored by a user and is referred to as a private key. Data encrypted using a public key can be decrypted only using a corresponding private key. Correspondingly, data encrypted using a private key can be decrypted only using a corresponding public key.

Node encryption: When an encryption technology is used to encrypt data at a transport layer, the encryption technology is referred to as node encryption.

End-to-end encryption: When an encryption technology is used to encrypt data above a network layer, for example, encrypt data transmitted at an application layer, the encryption technology is referred to as end-to-end encryption. Usually, end-to-end encryption is performed by a software module of the application layer. Therefore, end-to-end encryption may be implemented using software.

Digital signature: The digital signature may be a combination of a digit, a letter, and another character and is generated by a data sender. A third party cannot forge the digital signature. Therefore, it can be verified that data is actually from the sender. In a process of performing verification using the digital signature, the sender and a receiver agree on a same hash function in advance. When sending a data packet, the sender may use the hash function to obtain digest data of the data packet, use a private key to encrypt the digest data, use the encrypted digest data as a digital signature of the data packet, and then send the digital signature and the data to the receiver together. When receiving the data packet, the receiver may use the hash function to obtain the digest data of the data packet, and use a public key to decrypt the digital signature to obtain another piece of digest data. If the two pieces of digest data are the same, first, it may be determined that the data packet is from the sender. This is because, without the private key of the sender, the third party cannot use the private key to forge the digital signature of the sender. Second, it may be determined that the data packet is not tampered with during transmission and that there is no data loss. Because a feature of the hash function is that, as long as any bit in the data packet changes, the digest data, of the data packet, calculated using the hash function changes. Therefore, if the digest data does not change during transmission of the data packet, it may be determined that content of the data packet is not tampered with and that the data packet is completely transmitted.

Digital certificate: The digital certificate is used to verify authenticity of a public key. The digital certificate is a file that includes the public key and information about an owner of the public key. The digital certificate may be generated by a certificate authority (CA) center or a trusted organization defined in an enterprise system.

Tracker node: The tracker node is a node that maintains information about each downloader on a P2P network. Each peer node periodically reports a resource being downloaded and an Internet Protocol (IP) address and a port number that are of the peer node to the tracker node. The tracker node stores IP addresses and port numbers of all peer nodes that are currently downloading resources, to return all downloaders of the resources to the peer node.

Image (mirror): The image is a file storage form, and may be considered as a copy of an original file.

Image layer (mirror layer): Images are stored in a layered structure. An image structure corresponding to each layer is the image layer.

DOCKER: The DOCKER is an open-source container engine. A developer may use the DOCKER to package an application program and a running environment of the application program into a DOCKER image, and store the image into a DOCKER image site. When a user needs to use the application program, the user may download the image from the DOCKER image site, to create a DOCKER container that may run the application program.

DOCKER daemon: The DOCKER daemon is a daemon process running on a host machine. In a DOCKER system architecture, a DOCKER client may trigger various instructions based on an input operation performed by a user, and interact with the DOCKER daemon based on the various instructions. The DOCKER daemon may receive the instruction from the DOCKER client, and create a corresponding job and execute the corresponding job based on the instruction from the DOCKER client.

DOCKER image: The DOCKER image is a file system used to start a DOCKER container, and the file system includes an application and a binary system and a library file that are required by the application.

DOCKER container: The DOCKER container is an entity when a DOCKER image runs. The container may be created, started, stopped, deleted, suspended, and the like.

DOCKER image site (DOCKER registry): The DOCKER image site is configured to store and distribute a DOCKER image. An image is stored in the DOCKER image site as a plurality of image layers and one piece of image description information.

Tree network: The tree network is a network topology. All nodes in the tree network are organized in a tree, and the tree network includes a root node and a leaf node. Currently, a P2P streaming media network is usually constructed using the tree network. In the tree network, a resource flows unidirectionally along a branch. That is, the resource may only flow from the root node to the leaf node, and cannot flow from the leaf node to the root node.

Mesh network: The mesh network is a network topology. In this structure, all nodes are irregularly interconnected, and there is no absolute parent-child relationship. To be specific, a resource may flow from a node A to a node B or flow from the node B to the node A.

Tenant isolation of a public cloud (Public cloud Multi-tenant technology): In a shared data center, a single system architecture and a service are used to provide a same or even a customized service for most clients. In addition, customer data isolation may still be ensured.

Cloud computing service: According to the clod computing service, the internet accesses a remote server such that resource management and data processing are performed using the remote server. The cloud computing service is usually divided into three levels. From bottom to top, the levels are respectively: IaaS, platform as a service (PaaS), and software as a service (SaaS).

IaaS: The IaaS is an infrastructure provided by a cloud computing service, and may include a processing device, a storage device, a network device, and another processing resource. A user can remotely deploy, run, and control any infrastructure provided by the cloud computing service to enjoy the cloud computing service. The IaaS may be a large-scale high-performance physical server cluster, a large-scale storage array, and a high-bandwidth network architecture, and may form one or more data centers.

Public cloud: The public cloud is a cloud computing service that is built up for mass users. For the cloud computing service, costs are not required to deploy an infrastructure, and the cloud computing service may be sold on demand or free of charge. Usually, the public cloud is built by a cloud computing service provider. Using a public cloud technology, the cloud computing service provider may build up a large-scale cloud infrastructure, and map the cloud infrastructure to a large quantity of virtual machines using a virtualization technology, to provide the virtual machine for an enterprise. In this way, the enterprise does not need to build up its own infrastructure. The enterprise may rent the virtual machine and pay on demand to enjoy a computing resource of the cloud computing service.

Tenant: The tenant is an on-premise user of a public cloud, namely, a use that uses a computing resource of the public cloud.

Tenant isolation: The tenant isolation means that resources of different tenants are isolated from each other. For example, when a tenant A downloads a resource, the tenant A can download only a resource belonging to the tenant A, and cannot download a resource belonging to a tenant B. In this case, a cloud computing service implements tenant isolation for the tenant A and the tenant B.

Private cloud: The private cloud is a cloud computing service that is built up for a specified user or a specified organization. For the cloud computing service, costs are required to deploy an infrastructure.

Configuration management database (CMDB): The CMDB is a database configured to store and manage various configuration information of each device in a system.

The following describes an example of an application scenario of the embodiments of this application.

In an example of an application scenario, referring to FIG. 1, this embodiment of this application may be applied to a scenario in which an image is a downloaded from a DOCKER machine. Further, a user may enter a DOCKER pull instruction on a DOCKER client, to instruct to download an image with a specific name from the DOCKER machine. The DOCKER client may parse the DOCKER pull instruction, and send an image download request to a DOCKER daemon in the DOCKER machine. The DOCKER daemon may obtain a manifest file of the image from a DOCKER image site, parse the manifest file to obtain digest data of each image layer in the image, and for each image layer, determine, based on the digest data of the image layer, whether the image layer is downloaded locally or is being downloaded locally. If download of the image layer is not completed, it is identified that the image layer is being downloaded, and an image layer download request is generated. In this case, a peer client intercepts an image layer obtaining request from the DOCKER daemon, uses a token to obtain a seed file of the image layer from a tracker node, and obtains, from the seed file, a key pair corresponding to the image layer and IP address list of a peer node that has the image layer. The peer client selects one or more IP addresses from the IP address list, and uses a node to which the one or more IP addresses points or point as a peer node of the peer client. An encryption link is established between the peer client and the peer node using a key pair of the image layer. The peer client downloads an image layer package from the peer node through the encryption link, and sends the image layer package to the DOCKER daemon. The DOCKER daemon decompresses the image layer package, stores JSON information and content information that are of the image layer, finally obtains the image, and registers the image and stores the image into a local image graph.

On this basis, in another example of an application scenario, a large quantity of DOCKER machines may be deployed in a clustering and distributed manner. Images are distributed to the large quantity of DOCKER machines such that the images are distributed and deployed in batches.

Figure 2:
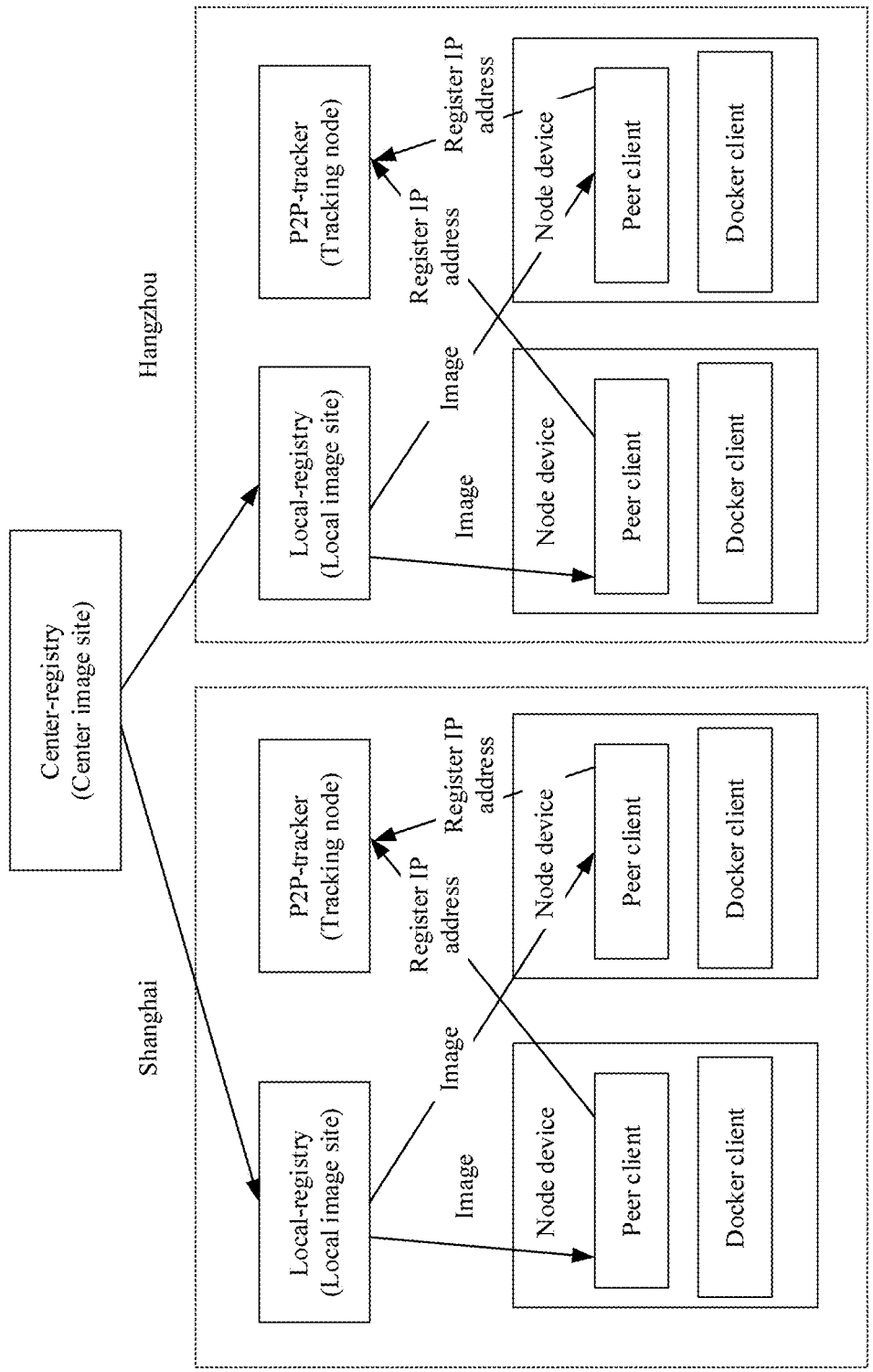
FIG. 2 is a schematic diagram of an application scenario according to an embodiment of this application.

Referring to FIG. 2, with reference to an architecture of a P2P network, a large quantity of DOCKER machines may be deployed as a large quantity of peer nodes. A main image site, a plurality of sub-image sites, and a plurality of tracker nodes are deployed. The main image site is also referred to as a center image site (center-registry), and the main image site is configured to provide an image layer for each sub-image site (local-registry). The sub-image site is also referred to as a local image site, and is configured to provide an image layer for each peer node. One or more sub-image sites may be deployed in each region. A peer client and a DOCKER client may be installed and run on the peer node. Service logic provided in this embodiment of this application may be encapsulated on the peer client. Using the peer client provided in this embodiment of this application, when a user uses the DOCKER client to download an image layer from an image site, the user may perform a P2P image layer download function using a native DOCKER pull command on the DOCKER client. In FIG. 2, two paths for the DOCKER client to obtain the image layer from the peer are described. A path 1 indicates a conventional manner: The image layer is downloaded from the image site. A path 2 indicates a P2P manner: The tracker node is used to obtain another peer that has the image layer, and the image layer is obtained from the other peer.

With reference to FIG. 2, the foregoing describes basic composition of an implementation environment when this embodiment of this application is applied to an image distribution service. In a possible implementation, this embodiment of this application may provide a resource distribution system that is general in the P2P network. Based on the resource distribution system provided in this embodiment of this application, various resources may be distributed, including but not limited to an image layer, streaming media data, bill data, a file, log data, and the like. The following provides specific descriptions with reference to FIG. 3.

Figure 3:
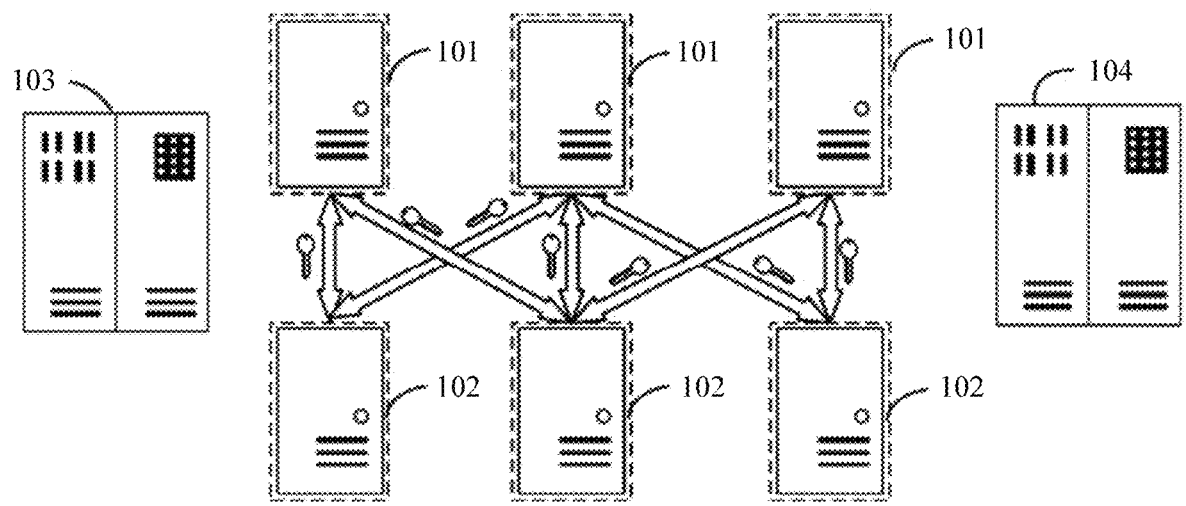
FIG. 3 is a schematic diagram of an implementation environment according to an embodiment of this application.

FIG. 3 is a schematic diagram of an implementation environment according to an embodiment of this application. The implementation environment includes a plurality of first nodes 101, a plurality of second nodes 102, a tracking node 103, and an authentication node 104. The plurality of first nodes 101, the plurality of second nodes 102, and the tracking node 103 may form a P2P network.

The first node 101 is a peer node that receives a target resource, and may be any peer node in the P2P network, for example, may be a node device in FIG. 2. The first node 101 may be a physical node, for example, may be a host. The host may be a computer device, a server, a personal computer, a notebook computer, a mobile terminal, or the like. In addition, the first node 101 may alternatively be a logical node, for example, may be a virtual machine or a container in a running state. An actual form of the first node 101 is not limited in this embodiment.

The second node 102 is a peer node that sends the target resource, and may be any peer node in the P2P network, for example, may be a node device in FIG. 2. The second node 102 may be a physical node, for example, may be a host. The host may be a computer device, a server, a personal computer, a notebook computer, a mobile terminal, or the like. In addition, the second node 102 may alternatively be a logical node, for example, may be a virtual machine or a container in a running state. An actual form of the second node 102 is not limited in this embodiment.

The tracking node 103, namely, a tracker node, may be, for example, a "P2P-tracker" node in FIG. 2. The tracking node 103 can determine a key pair corresponding to each resource, and distribute the key pair corresponding to the resource to each peer node. Alternatively, the tracking node 103 can determine a digital certificate corresponding to each resource, and distribute the digital certificate corresponding to the resource to each peer node. The tracking node 103 may record an IP address and a port number of each peer node. The tracking node 103 may establish a network connection to each first node 101 and each second node 102. The tracking node 103 may be a computer device, a server, a personal computer, or the like.

The authentication node 104, namely, an auth node, can determine a permission, on each resource, identified by a user that logs on each peer node, to authenticate a permission of each peer node on the resource. The authentication node 104 can send token data to a corresponding peer node based on the permission of each peer node on the resource. The authentication node 104 may establish a network connection to each first node 101 and each second node 102. The authentication node 104 may be a computer device, a server, a personal computer, or the like. For example, the authentication node 104 may be a DOCKER auth node.

Figure 4:
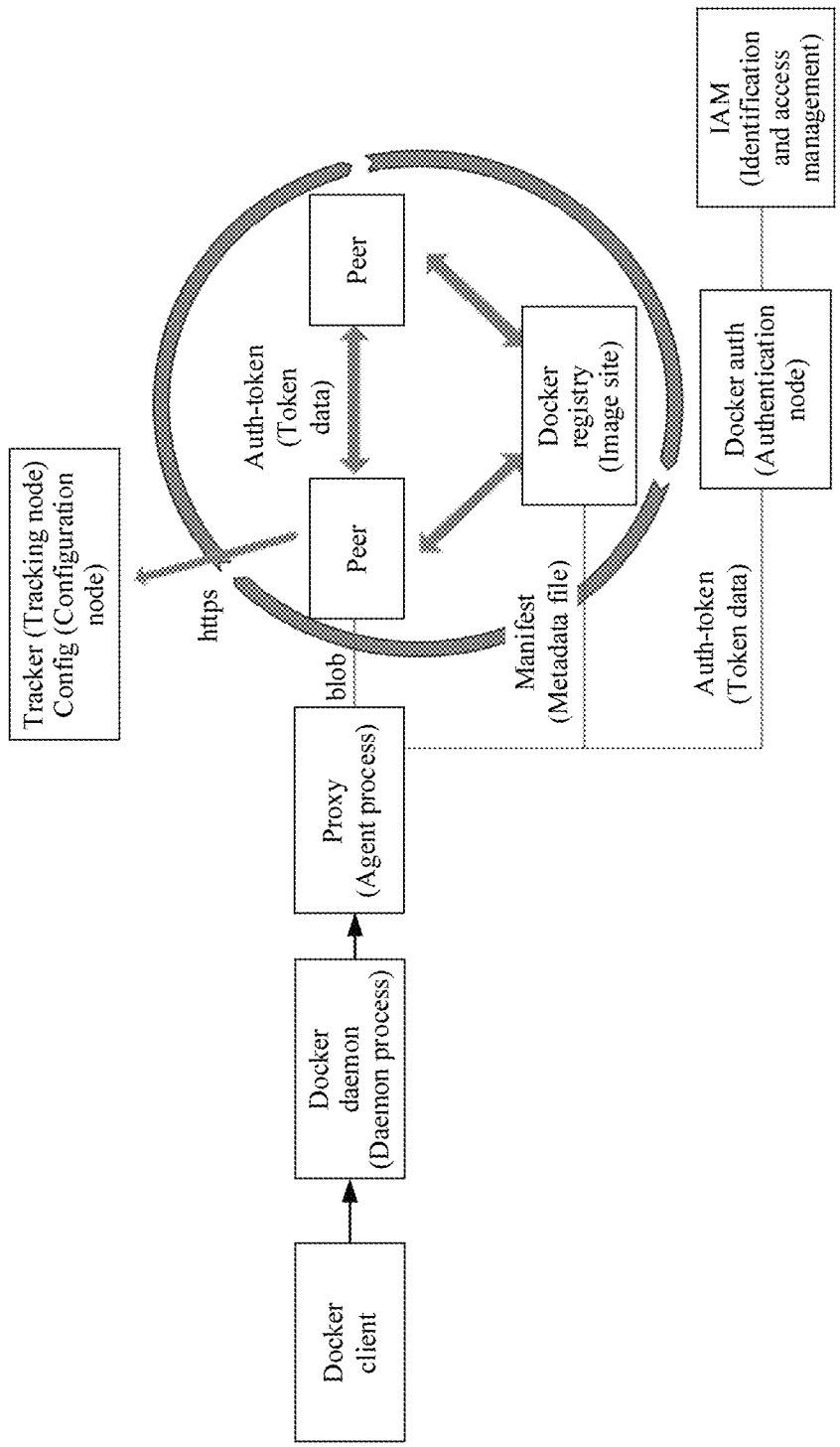
FIG. 4 is a schematic diagram of an architecture of an image distribution system according to an embodiment of this application.

With reference to a scenario of an image distribution service, FIG. 4 is a system architecture diagram of distributing a DOCKER image based on a P2P network according to an embodiment of this application. The system architecture includes a plurality of peer nodes, a DOCKER registry, a tracker node, a DOCKER daemon, a DOCKER auth, a DOCKER client, and a proxy. The plurality of peer nodes may be provided as the first node and the second node in the implementation environment. The tracker node is the tracking node 103 in the implementation environment, and may distribute a key pair of a resource to the plurality of peer nodes. The DOCKER registry is an image site, and may store a large quantity of image layers as resources required by the peer node. The proxy may be a BT client, and may perform proxying on the DOCKER daemon to download an image.

Figure 5:
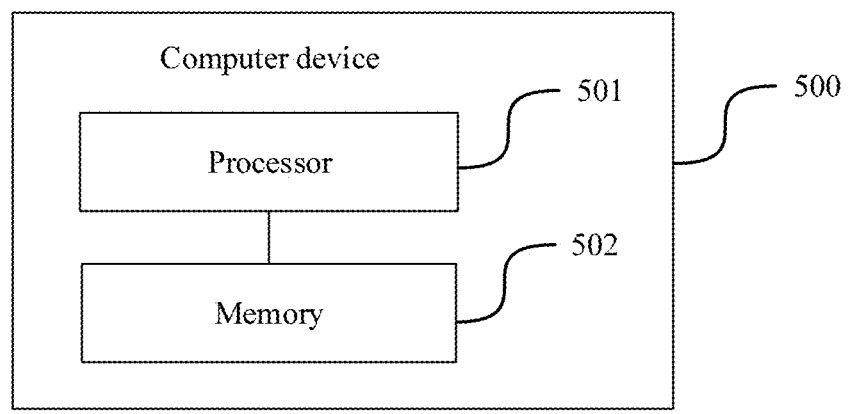
FIG. 5 is a schematic structural diagram of a computer device according to an embodiment of this application.

FIG. 5 is a schematic structural diagram of a computer device according to an embodiment of this application. The computer device 500 may be provided as a first node, a second node, or a tracking node. The computer device 500 may differ greatly because of different configurations or performance. The computer device 500 may include one or more processors (e.g. (Central Processing Unit (CPU)) 501 and one or more memories 502. The memory 502 stores at least one instruction. The at least one instruction is loaded and executed by the processor 501 to implement a method performed by the first node, a method performed by the second node, or a method performed by the tracking node in the following method embodiments. Certainly, the computer device may also have a component for input and output, such as a wired or wireless network interface, a keyboard, and an input/output interface. The computer device 500 may also include another component for implementing a function of the device. Details are not described herein again.

In an example embodiment, a computer-readable storage medium is further provided, for example, a memory including an instruction. The instruction may be executed by the processor in the computer device to complete the method performed by the first node, the method performed by the second node, or the method performed by the tracking node in the following embodiments. For example, the computer-readable storage medium may be a read-only memory (ROM), a random-access memory (RAM), a compact disc ROM (CD-ROM), a magnetic tape, a floppy disk, or an optical data storage device.

Figure 6A:
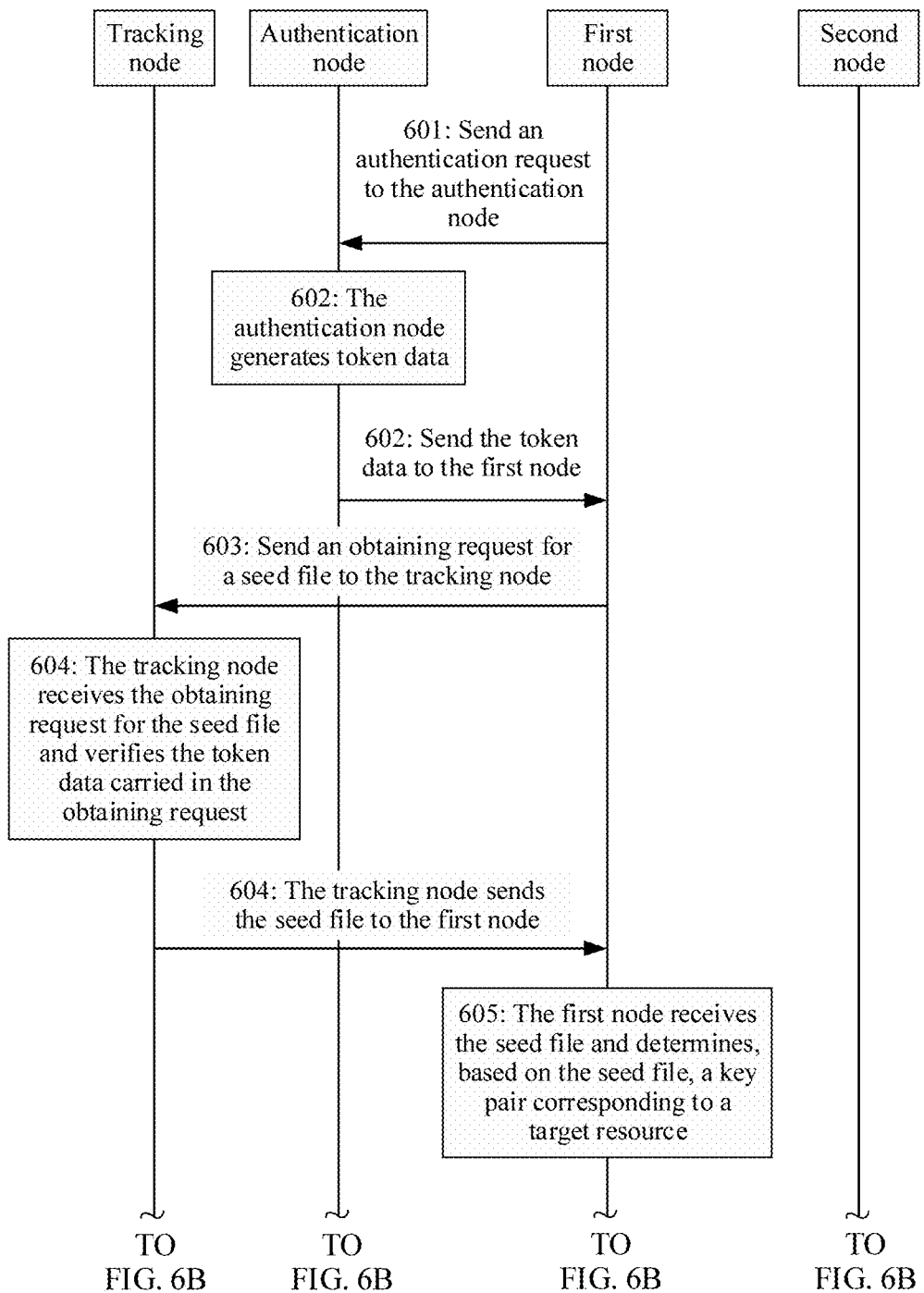
FIG. 6A and FIG. 6B are a flowchart of a resource obtaining method according to an embodiment of this application.
Figure 6B:
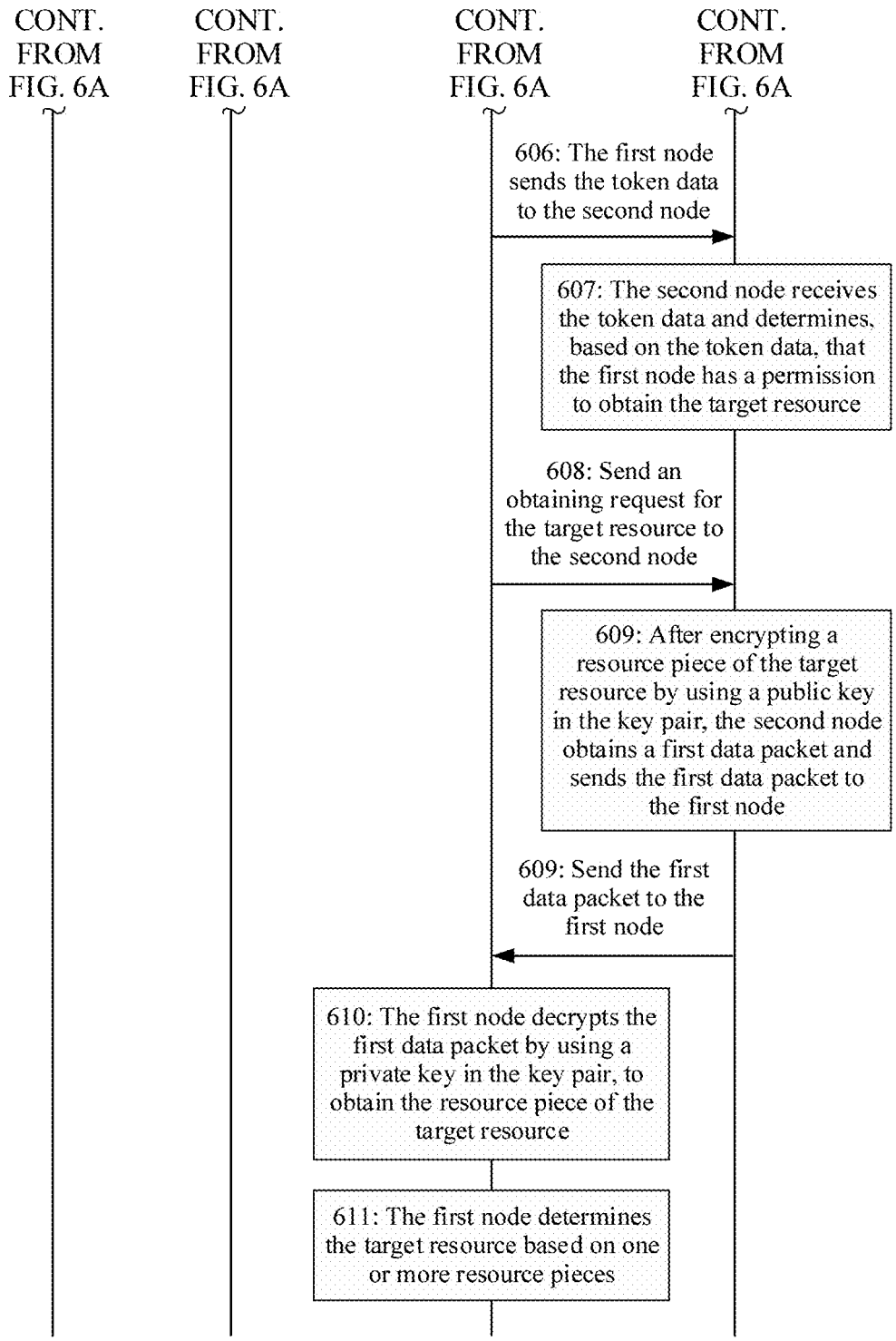

FIG. 6A and FIG. 6B are a flowchart of a resource obtaining method according to an embodiment of this application. Interaction bodies of the method include a first node, a second node, a tracking node, and an authentication node. As shown in FIG. 6A and FIG. 6B, the method includes the following steps.

Step 601: When receiving an obtaining instruction for a target resource, the first node sends an authentication request to the authentication node.

To distinguish and describe different peer nodes in a P2P network, in this embodiment, a peer node that receives the target resource is referred to as the first node, and a peer node that sends the target resource is referred to as the second node. The first node and the second node may be any peer node in the P2P network.

The target resource is a resource that needs to be obtained. A type of the target resource may be determined based on an actual service. For example, when being applied to an image distribution scenario, the target resource may be an image layer, for example, may be an image layer in a DOCKER image. In addition, the target resource may alternatively be a file, a picture, audio, a video, transaction data, log data, or the like. A type of the resource is not limited in this embodiment.

A function of the obtaining instruction is to instruct the first node to obtain the target resource. After receiving the obtaining instruction, the first node may determine to obtain the target resource from a peer node in the P2P. The obtaining instruction may be triggered by an input operation of a user. The user may trigger the input operation on the first node. The first node detects the input operation, to receive the obtaining instruction. In addition, the user may alternatively trigger the input operation on a remote device. After detecting the input operation, the remote device may send the obtaining instruction to the first node through a network connection. Then the first node may receive the obtaining instruction. For content of the obtaining instruction, the obtaining instruction may carry an identifier of the target resource, and the identifier of the target resource may be a name of the target resource. For example, the obtaining instruction may be a DOCKER pull instruction, and the DOCKER pull instruction may carry a name of an image layer.

The authentication request is used to authenticate a permission identified by a user that logs on the first node. The authentication request may carry an identifier of the user that logs on the first node and the identifier of the target resource such that the authentication node authenticates, based on the identifier of the user and the identifier of the target resource, a permission of the user on the first node on the target resource. In this embodiment, after receiving the obtaining instruction, the first node generates the authentication request, and sends the authentication request to the authentication node, to obtain, from the authentication node, token data corresponding to the login user.

In an example scenario, the image distribution scenario is used as an example. The target resource may be the image layer, the authentication node may be a DOCKER auth, the obtaining instruction may be the DOCKER pull instruction, and a DOCKER daemon runs on the first node. In this case, step 601 may include: A DOCKER client receives the DOCKER pull instruction, and sends a request to the DOCKER daemon. After receiving the request from the DOCKER client, the DOCKER daemon obtains, from the DOCKER auth, a resource permission token corresponding to the login user.

Step 602: The authentication node receives the authentication request, generates token data, and sends the token data to the first node.

The token data, namely, a token, may be considered as a token issued by the authentication node to the first node. The token data is used to indicate various permissions of the first node on the target resource such that when the first node holds the token data to request for the target resource from another node, the other node can verify, based on the token data, whether the first node has a permission to obtain the target resource, to determine whether to return the target resource to the first node.

In this embodiment, that the first node has a permission to obtain a resource is used as an example. The token data may indicate that the first node has the permission to obtain the target resource. Subsequently, the first node holds the token data to request for the target resource from the other node. The other node can verify, based on the token data, that the first node has the permission to obtain the target resource, and return the target resource to the first node.

For content of the token data, the token data may include at least one permission identifier. The permission identifier is used to identify a corresponding permission, and may be a name of the permission. For example, the permission identifier may be "pull", to identify that the first node has the permission to obtain the target resource. For example, the permission identifier may be "push", to identify that the first node has a permission to push the target resource. In this way, the token data can indicate at least one permission of the first node on the target resource, and the at least one permission includes the permission to obtain the target resource.

Optionally, the token data may further include the name of the target resource. Because the token data carries the name of the target resource, any node that receives the token data can determine, based on the name, of the target resource, carried in the token data, that the token data corresponds to the target resource. In a possible implementation, a resource field may be set based on the token data, and a value of the resource field is a resource name. In addition, the token data may further include a digital signature. Because the token data carries the digital signature, any node that receives the token data can determine, by verifying the digital signature carried in the token data, that the token data is not tampered with during transmission. For a process of generating the digital signature in the token data, digest information may be extracted from a data part of the token data, and then the digest information is encrypted using a private key, to obtain the digital signature. In a possible implementation, a sign field may be set based on the token data, and a value of the sign field is the digital signature of the token data.

For example, FIG. 7 is a schematic diagram of token data according to an embodiment of this application. The value of the resource field in the token data is "domain/namespace/repo". Values of an access field are "pull" and "push", where "pull" means that the first node has a permission to obtain a resource named "domain/namespace/repo", and "push" means that the first node has a permission to send the resource named "domain/namespace/repo".

In a process of generating the token data, the authentication node may authenticate, based on the authentication request, the permission identified by the user that logs on the first node, and generate the token data based on an authentication result. The authentication node may predetermine a permission of each node in the P2P network on each resource. After receiving the authentication request, the authentication node may parse the authentication request to obtain the identifier of the user that logs on the first node and the identifier of the target resource, and determine, based on the identifier of the user and the identifier of the target resource, a permission of the first node on the target resource.

In a possible implementation, the authentication node may store a mapping relationship between a user identifier, a resource identifier, and a permission identifier. The mapping relationship includes the user identifier, the resource identifier, and the permission identifier. The authentication node may query the mapping relationship based on the identifier of the user that logs on the first node and the identifier of the target resource, obtain, from the mapping relationship, a permission identifier corresponding to both the identifier of the user and the identifier of the target resource to obtain at least one permission identifier, and generate the token data based on the at least one permission identifier.

Step 603: The first node receives the token data from the authentication node, and sends an obtaining request for a seed file to the tracking node, where the obtaining request carries the token data.

The obtaining request for the seed file is used to request the tracking node to send the seed file such that the tracking node returns, to the first node, the seed file including a key pair corresponding to the target resource. In this embodiment, the obtaining request, for the seed file, sent by the first node carries the token data. Therefore, a process in which the first node sends the obtaining request for the seed file may be considered as follows The first node holds the token data from the authentication node, to obtain the seed file from the tracking node.

For the process of sending the obtaining request for the seed file, the first node may generate the obtaining request for the seed file based on a communications protocol between the first node and the tracking node, and the obtaining request for the seed file carries the token data. In a possible implementation, the communications protocol between the first node and the tracking node may be a Hypertext Transfer Protocol (HTTP) over Secure Socket Layer (SSL) (HTTPS). In this case, the first node may generate an HTTPS get request based on the HTTPS protocol, and send the HTTPS get request including the token data to the tracking node.

Optionally, in the image distribution scenario, after receiving the token data, the first node may obtain a metadata file (namely, a manifest file) from an image site based on the token data, and parse the metadata file to obtain an identifier of an image layer carried in the metadata file, to determine an image layer that needs to be obtained and use the image layer that needs to be obtained as the target resource.

Optionally, the first node may include a daemon process and an agent process, and the foregoing steps may be separately performed by the daemon process and the agent process. The daemon process may be a process on a client that processes a resource. The daemon process may interact with the authentication node. The process of sending the authentication request to the authentication node and receiving the token data may be performed by the daemon process. The agent process may be referred to as a proxy of the daemon process. The agent process can replace the daemon process to perform a task of obtaining a resource, and the agent process may interact with the tracking node. In this case, when the daemon process generates an obtaining request for the target resource, the agent process may intercept the obtaining request for the target resource, generate the obtaining request for the seed file, and send the obtaining request for the seed file to the tracking node.

For example, in the image distribution scenario, the daemon process may be a DOCKER daemon process, the agent process may be a proxy process, and the first node may run the DOCKER daemon process and the proxy process. When the DOCKER daemon generates an obtaining request for the image layer and prepares to send the obtaining request for the image layer to the image site, the proxy process may intercept the request that is from the DOCKER daemon process, and hold the token to send the obtaining request for the seed file to a tracker node, to obtain a seed file corresponding to the image layer from the tracker.

Step 604: The tracking node receives the obtaining request for the seed file, verifies the token data carried in the obtaining request, and sends the seed file to the first node.

Further, the tracking node may parse the token data, and determine the at least one permission of the first node on the target resource, to determine whether the first node has the permission to obtain the target resource. When the first node has the permission to obtain the target resource, the tracking node may generate, using the key pair corresponding to the target resource, a seed file corresponding to the target resource, and send the seed file to the first node. When the first node does not have the permission to obtain the target resource, the tracking node does not need to generate the seed file corresponding to the target resource, and may reject a request from the first node. In addition, the tracking node may send a failure notification to the first node.

In a possible implementation, with reference to the content of the token data, the tracking node may determine the at least one permission identifier carried in the token data, and determine whether the at least one permission identifier has an identifier for obtaining a target permission. When the at least one permission identifier has the identifier for obtaining the target permission, it may be determined that the first node has the permission to obtain the target resource.

The seed file, namely, a BT seed, is used to provide resource-related information for each peer node in the P2P network, for example, provide an IP address and a port number of a peer node that downloads a resource. An extension of the seed file may be .torrent. The seed file is also referred to as a meta information file or a metafile. The seed file may be encoded in a Becoding coding manner, and may be considered as dictionary data of Becoding encoding.

For content of the seed file, in this embodiment, the seed file may carry the key pair corresponding to the target resource. For details, refer to the following implementation 1. In addition, the seed file may also carry a digital certificate corresponding to the target resource. For details, refer to the following implementation 2.

Implementation 1: The tracking node may determine the identifier, of the target resource, carried in the token data, and determine, based on the identifier of the target resource, that the first node needs to obtain the target resource. Then the tracking node obtains the key pair corresponding to the target resource. The seed file carries the key pair corresponding to the target resource such that the first node encrypts and/or decrypts a data packet related to the target resource using the key pair corresponding to the target resource.

For a process of determining the key pair corresponding to the target resource, the tracking node may prestore a key pair corresponding to each resource in the P2P network. Therefore, the key pair corresponding to the target resource may be determined based on the prestored key pair. In a possible implementation, the tracking node may store a mapping relationship between a resource identifier and a key pair. The mapping relationship includes at least one resource identifier and at least one corresponding key pair. When receiving the obtaining request for the seed file, the tracking node may query the mapping relationship based on the identifier of the target resource, to obtain, from the mapping relationship, the key pair corresponding to the target resource.

For a manner of generating a key pair corresponding to a resource, in a possible implementation, a corresponding key pair may be generated, using an asymmetric encryption algorithm, for each resource transmitted in the P2P network. The asymmetric encryption algorithm includes but is not limited to a Rivest-Shamir-Adleman (RSA) algorithm, an ElGamal algorithm, a Diffie-Hellman algorithm, and the like. The asymmetric encryption algorithm may be any encryption algorithm supported by an SSL protocol and the HTTPS protocol.

Implementation 2: The tracking node may determine the identifier, of the target resource, carried in the token data, and determine, based on the identifier of the target resource, that the first node needs to obtain the target resource. Then the tracking node obtains the digital certificate corresponding to the target resource. The seed file carries the digital certificate corresponding to the target resource such that the first node uses the digital certificate to generate the key pair corresponding to the target resource, and the first node encrypts and/or decrypts the data packet related to the target resource using the key pair corresponding to the target resource. The identifier of the target resource may be the name of the target resource.

For a process of determining the digital certificate corresponding to the target resource, the tracking node may prestore a digital certificate corresponding to each resource in the P2P network. Therefore, the digital certificate corresponding to the target resource may be determined based on the prestored digital certificate. In a possible implementation, the tracking node may store a mapping relationship between a resource identifier and a digital certificate. The mapping relationship includes at least one resource identifier and at least one corresponding digital certificate. When receiving the obtaining request for the seed file, the tracking node may query the mapping relationship based on the identifier of the target resource, to obtain, from the mapping relationship, the digital certificate corresponding to the target resource.

In addition, the seed file may further include other content as required. For example, the seed file may further include a hash value of each resource piece in a resource. The hash value of the resource piece is used to verify correctness and integrity of the resource piece, and may be a Sha1 value. For the hash value of the resource piece, a Sha1 algorithm may be used to calculate the resource piece, to generate a 20-byte sha1 value. For another example, the seed file may further include peer node information. The peer node information is used to indicate a peer node that has the target resource, and may be an IP list of a peer node that has the target resource for the first time.

It should be noted that, in this embodiment, the key pair may be uniquely available to the target resource. That is, the key pair uniquely corresponds to the target resource. A private key in the key pair corresponding to the target resource can decrypt only the encrypted target resource, and cannot decrypt another encrypted resource. Therefore, even if the key pair is cracked, the key pair cannot be used to decrypt a resource other than the target resource, and secure transmission of another resource in the P2P network is not affected. Further, each resource transmitted in the P2P network may have a unique corresponding key pair, and key pairs of resources are different from each other. This greatly improves transmission security of a resource in the P2P network.

In a possible design, the first node may store the mapping relationship between a resource identifier and a key pair. After obtaining the key pair corresponding to the target resource, the first node may add the identifier of the target resource and the key pair to the mapping relationship, to correspondingly store the target resource and the key pair. By analogy, each resource that needs to be downloaded and each key pair may be correspondingly stored. Each time any resource needs to be downloaded, a key pair corresponding to the resource may be obtained by querying the mapping relationship, and a data packet related to the resource is encrypted and/or decrypted using the key pair corresponding to the resource. In this way, when different resources are transmitted in the P2P, different key pairs are used to ensure that the resources are isolated from each other during transmission.

In an example of an application scenario, that the DOCKER image is distributed in a public cloud is used as an example. Each DOCKER image layer may have a unique corresponding key pair. For example, an image layer 1 corresponds to a key pair 1, an image layer 2 corresponds to a key pair 2, and an image layer 3 corresponds to a key pair 3. Key pairs of the three image layers are different from each other. In this way, it may be ensured that each peer node can obtain only an image layer that the peer node has a permission to obtain, but cannot obtain an image layer that the peer node does not have the permission to obtain. This greatly improves security of image distribution in the public cloud, and implements tenant isolation.

Step 605: The first node receives the seed file and determines, based on the seed file, the key pair corresponding to the target resource.

With reference to the implementation 1, the first node may parse the seed file to obtain the key pair carried in the seed file. With reference to the implementation 2, the first node may obtain the digital certificate, and generate the key pair based on the digital certificate.

It should be noted that, the foregoing is merely described using an example in which the tracking node sends the key pair to the first node. Similarly, the tracking node may distribute the key pair to each peer node, related to the target resource, in the P2P network. For example, the tracking node may distribute the key pair to each peer node that requests to download the target resource. For another example, the tracking node may distribute the key pair to each peer node that is downloading or has downloaded the target resource. In this case, through a process of distributing the key pair, all peer nodes, related to the target resource, in the P2P network hold the key pair corresponding to the target resource such that the peer nodes use the key pair to encrypt the target resource.

Similar to the foregoing process in which the first node determines the key pair corresponding to the target resource, the second node may determine, in a same manner, the key pair corresponding to the target resource, and download the target resource from another peer node in the P2P network. In this case, both the first node and the second node obtain the key pair corresponding to the target resource. The first node needs to obtain the target resource, and the second node holds the target resource. The second node may use the key pair to perform encrypted communication with the first node, to transmit the target resource.

Step 606: The first node sends the token data to the second node.

The first node may obtain peer node information from the tracking node. The peer node information includes an IP address of at least one peer node. The first node may select an IP address from at least one IP address, and use a peer node corresponding to the IP address as the second node. The first node may establish a network connection to the second node, and send the token data to the second node through the network connection such that the second node verifies the permission of the first node on the target resource based on the token data.

For a manner of sending the token data, in a possible implementation, the first node and the second node may perform TCP three-way handshake communication based on a TCP to establish a TCP persistent connection. During the TCP persistent connection, the first node and the second node may perform two-way handshake communication based on a P2P protocol. The first node sends the token data during the two-way handshake communication. Further, the first node may generate a P2P handshake request, and send the P2P handshake request to the second node. The P2P handshake request carries the token data such that a permission is verified when the first node performs a P2P handshake with the second node. The P2P handshake request may include a reserved field, and the token data may be carried in the reserved field.

In a possible design, the token data may be transmitted with reference to a digital signature mechanism. For example, a data packet that carries the token data and the digital signature is described as a third data packet. The first node may add the digital signature to the token data using a private key, to obtain the third data packet, and send the third data packet. Further, the first node may obtain digest data of the token data using a hash algorithm, encrypt the digest data using the private key in the key pair corresponding to the target resource, to obtain the digital signature, and encapsulate the token data and the digest data to obtain the third data packet. In this case, the third data packet carries the token data and the digital signature of the first node such that the second node can verify, based on the digital signature, that the token data is not tampered with during transmission, and verify integrity of the token data.

In a process of determining the second node, the first node may obtain the peer node information from the tracking node. The peer node information includes an IP address of a peer node, in the P2P network, downloading the target resource. The first node may parse the peer node information to obtain one or more IP addresses, select an IP address from the one or more IP addresses, use a node corresponding to the selected IP address as the second node, and send the token data to the second node.

Step 607: The second node receives the token data and determines, based on the token data, that the first node has the permission to obtain the target resource.

In a process of verifying the token data, the second node may parse the token data from the first node, and determine, based on the token data, whether the first node has the permission to obtain the target resource. When the first node has the permission to obtain the target resource, the second node subsequently responds to the obtaining request for the target resource from the first node. When the first node does not have the permission to obtain the target resource, the second node may return error information to the first node, and interrupt the connection to the first node.

Further, in a possible implementation, a permission identifier in the token data may indicate the permission of the first node on the target resource. After parsing the token data, the second node may obtain at least one permission identifier carried in the token data. The second node determines, based on the at least one permission identifier, whether the at least one permission identifier includes an identifier of the permission for obtaining the target resource, to determine whether the first node has the permission to obtain the target resource. In addition, the second node may determine, based on the identifier, of the target resource, carried in the token data, the target resource that the first node needs to obtain.

For example, referring to FIG. 7, it is assumed that the token data from the first node is shown in FIG. 7. The second node parses the resource field to obtain the "domain/namespace/repo". In this case, it is determined that the first node requests to obtain the resource named "domain/namespace/repo". The second node parses the access field to obtain the "pull" and the "push". In this case, it is determined that the first node has an obtaining permission and a sending permission on the resource named "domain/namespace/repo". That is, in the token data from the first node, it is indicated that the first node has a permission to obtain a resource corresponding to the "domain/namespace/repo". In this case, identity verification performed by the second node on the first node succeeds, and subsequently the second node sends the resource corresponding to the "domain/namespace/repo" to the first node.

In a possible design, with reference to the digital signature mechanism, the second node may receive the third data packet, parse the third data packet to obtain the token data and the digital signature that are carried in the third data packet, and decrypt the digital signature using a public key. If decryption succeeds, the digest data that converts the digital signature into the token data may be obtained. In this case, it may be determined that the token data is indeed from the first node. In addition, a hash value of the token data may be obtained using the hash algorithm. When the hash value obtained using the hash algorithm is the same as the digest data obtained through the decryption, it may be determined that the token data is not tampered with during transmission, and the token data is complete without information loss.

Step 608: The first node sends the obtaining request for the target resource to the second node.

The obtaining request for the target resource is a request message corresponding to the target resource. With reference to a resource piece transmission mechanism in the P2P network, the obtaining request for the target resource may be an obtaining request for one or more resource pieces in the target resource. The obtaining request for the target resource may carry an identifier of the resource piece, a length of data that is requested to be sent by the second node, and the like. With reference to the image distribution scenario, the obtaining request for the target resource may be a request for the image layer.

It should be noted that in this embodiment, the target resource may be transmitted between the first node and the second node in a link encryption manner. Further, it may be considered that for the target resource, an encryption channel is established between the first node and the second node, and any data packet transmitted over the encryption channel is encrypted using a key pair. That is, when various communication messages are transmitted between the first node and the second node, the key pair may be used to encrypt and/or decrypt the communication messages. On one hand, when a data packet that carries content of the target resource is transmitted, for example, a data packet that carries the resource piece, the data packet that carries the content of the target resource is transmitted in a ciphertext form over the encryption channel. On the other hand, when a data packet that does not carry the content of the target resource is transmitted, for example, signaling on a control plane, a handshake message during connection establishment, or a heartbeat message during connection maintaining, these packets are also transmitted in the ciphertext form over the encryption channel.

With reference to the link encryption manner, in a possible design, the obtaining request for the target resource may be encrypted using the key pair for transmission. For example, after the obtaining request for the target resource is encrypted, a generated data packet is described as a second data packet. After generating the obtaining request for the target resource, the first node may encrypt the obtaining request using the public key, to obtain the second data packet, and send the second data packet to the second node. In this way, because the second data packet is a ciphertext, even if the second data packet is intercepted, if there is no key pair corresponding to the target resource, content of the obtaining request cannot be cracked. This ensures secure transmission of a message related to the target resource.

For specific implementation of link encryption, in a possible implementation, the first node and the second node may support the SSL protocol. A key pair, in the SSL protocol, used to transmit a data packet is set to the key pair corresponding to the target resource. In this case, when the first node communicates with the second node based on the SSL protocol, various messages transmitted between the first node and the second node are encrypted using the key pair. Further, both the first node and the second node may include a communications unit. The communications unit may include a network adapter and BLUETOOTH. The communications unit is configured to perform communication at a data link layer. The first node and the second node may write, into a driver of their respective communications unit, the key pair corresponding to the target resource. In this case, the first node and the second node control respective communications unit. During communication at the data link layer, various data packets transmitted at the data link layer are encrypted using the key pair.

It should be noted that, the foregoing merely describes an example in which the target resource is encrypted through the link encryption using the key pair. In a possible implementation, the target resource may be encrypted in another manner between the first node and the second node, for example, the target resource may be encrypted in a manner such as node encryption or end-to-end encryption. A specific manner of encrypting the target resource using the key pair is not limited in this embodiment.

Step 609: After receiving the obtaining request for the target resource and encrypting a resource piece of the target resource using the public key in the key pair, the second node obtains a first data packet and sends the first data packet to the first node.

Further, the second node may parse the obtaining request for the target resource to obtain an identifier of the resource piece carried in the obtaining request. The second node may learn, based on the identifier of the resource piece, that the first node requests the resource piece of the target resource, to determine the key pair corresponding to the target resource. The second node uses the public key in the key pair to encrypt the resource piece of the target resource, to obtain the first data packet. The first data packet is a ciphertext. The first data packet may carry a complete resource piece of the target resource, or may carry a part of the resource piece, for example, carry one or more slices of the resource piece.

In a possible design, with reference to the link encryption manner, the obtaining request, for the target resource, received by the second node may be the second data packet in a ciphertext form. The second node may decrypt the second data packet using the private key in the key pair, to obtain the obtaining request for the target resource.

Step 610: The first node receives the first data packet, and decrypts the first data packet using the private key in the key pair, to obtain the resource piece in the target resource.

Further, after receiving the first data packet, the first node may determine the private key in the key pair corresponding to the target resource, and decrypt the first data packet using the private key and a decryption algorithm, to obtain the resource piece carried in the first data packet. The decryption algorithm may be in any asymmetric encryption algorithm.

It should be noted that, the foregoing is merely described using an example in which the first node obtains the resource piece from one second node in the P2P network. Similarly, the first node may obtain a plurality of resource pieces of the target resource from a plurality of second nodes in the P2P network. Because the key pair corresponds to the target resource, when communicating with each second node for the target resource, the first node uses the key pair to perform encryption and/or decryption. By analogy, in the P2P network provided in this embodiment of this application, the key pair may be used for link encryption over each link that is for transmitting the target resource.

It should be further noted that, when the first node obtains another resource from the second node, the second node may encrypt the other resource using a key pair corresponding to the other resource. Correspondingly, when receiving the other resource, the first node may decrypt the other resource using the key pair corresponding to the other resource.

In a possible implementation, each peer node in the P2P network may store the mapping relationship between a resource identifier and a key pair. The mapping relationship includes one or more resource identifiers and one or more corresponding key pairs such that a stored resource corresponds to a key pair. Therefore, each time any peer node requests any resource, the mapping relationship may be queried to obtain a key pair corresponding to the resource, and an encryption link is established between the peer node and another peer node using the key pair. Similarly, each time any peer node needs to send any resource, the mapping relationship may be queried to obtain a key pair corresponding to the resource, and the key pair is used to decrypt a resource requested by another peer node.

Step 611: The first node determines the target resource based on the one or more resource pieces.

The target resource may be divided into the one or more resource pieces. For each resource piece in the target resource, the first node may obtain the resource piece from the second node using the foregoing steps. In this case, after all resource pieces in the target resource are obtained, the first node may sort all the resource pieces according to an arrangement sequence of all the resource pieces in the target resource, and splice the resource pieces to obtain the target resource.

Figure 8:
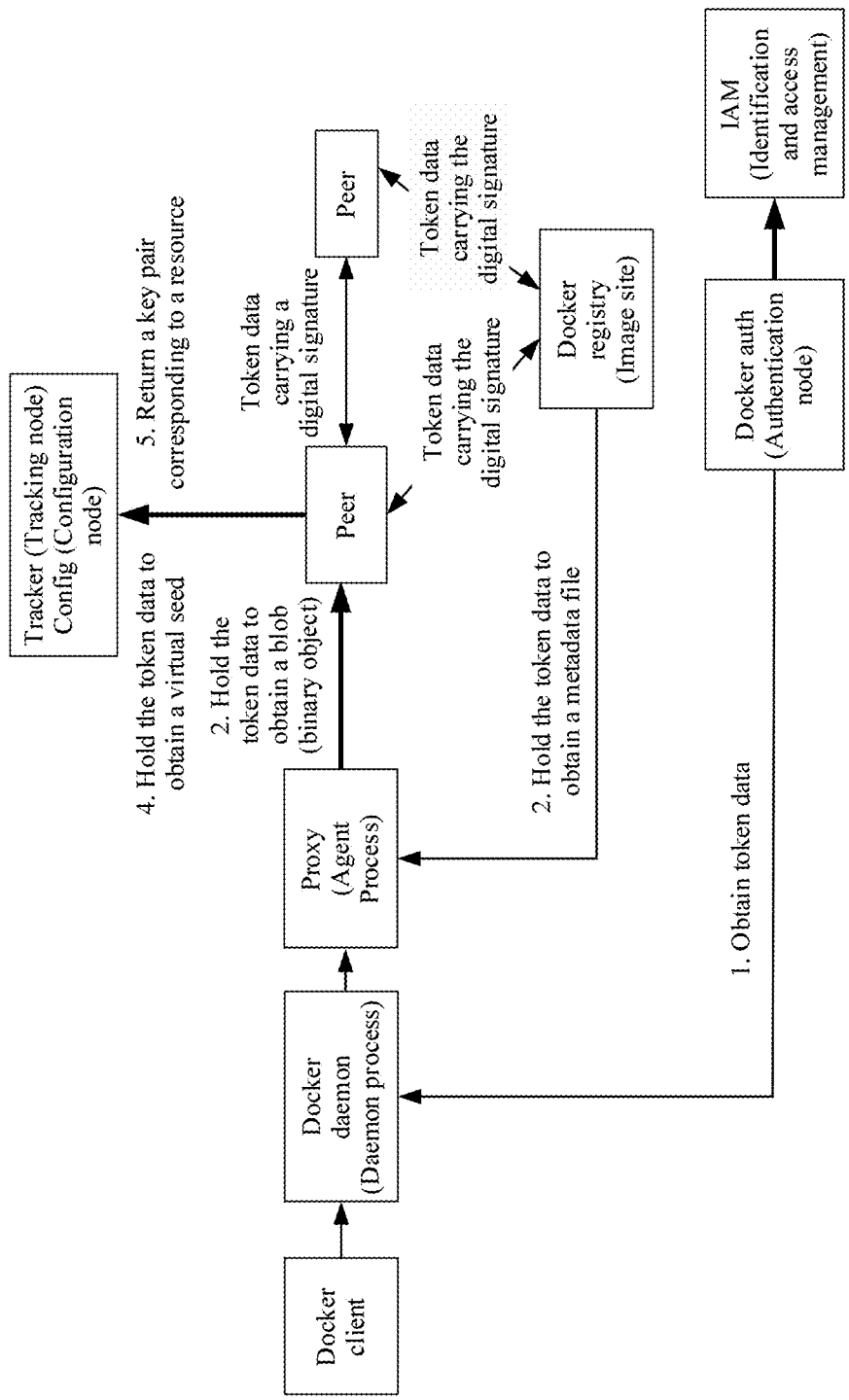
FIG. 8 is a flowchart of an image obtaining method according to an embodiment of this application.

In conclusion, that the foregoing is applied to a DOCKER image distribution service is used as an example. FIG. 8 is a flowchart of a DOCKER image obtaining method according to an embodiment of this application. The method includes the following step 1 to step 5.

Step 1: A DOCKER daemon obtains a token from a DOCKER auth, where the token indicates a permission of a login user on an image layer.

Step 2: The DOCKER daemon holds the token to obtain a manifest from a DOCKER registry.

Step 3: A proxy holds the token to obtain a blob file.

Step 4: A peer holds the token to obtain a BT seed of the image layer from a tracker.

Step 5: The tracker returns a unique key pair available to the image layer and a list of IP addresses that have the image layer.

Then, communication may be performed between peers using the key pair.

The method provided in this embodiment introduces an authentication mechanism to the P2P network. When different peer nodes communicate with each other, the key pair is used for encryption. A peer node that has a resource may use the public key in the key pair to encrypt the resource, and then send the encrypted resource to another peer node. A peer node that requests the resource may use the private key in the key pair to decrypt the encrypted resource, and convert the resource from a ciphertext to a plaintext. This can avoid a security risk caused by stealing of the resource during resource transmission in the P2P network, to greatly improve security of the P2P network. In addition, each resource may have a corresponding key pair, and different key pairs may be used to encrypt resources of different users. Therefore, this ensures that any user cannot decrypt a resource of another user using a key of the user and cannot access the resource of the other user. This implements mutual isolation of resources of different users. In particular, when being applied to an image distribution service in a public cloud, the foregoing may be provided as a solution of securely distributing an image based on the P2P network, to ensure tenant isolation of the public cloud.

Figure 9:
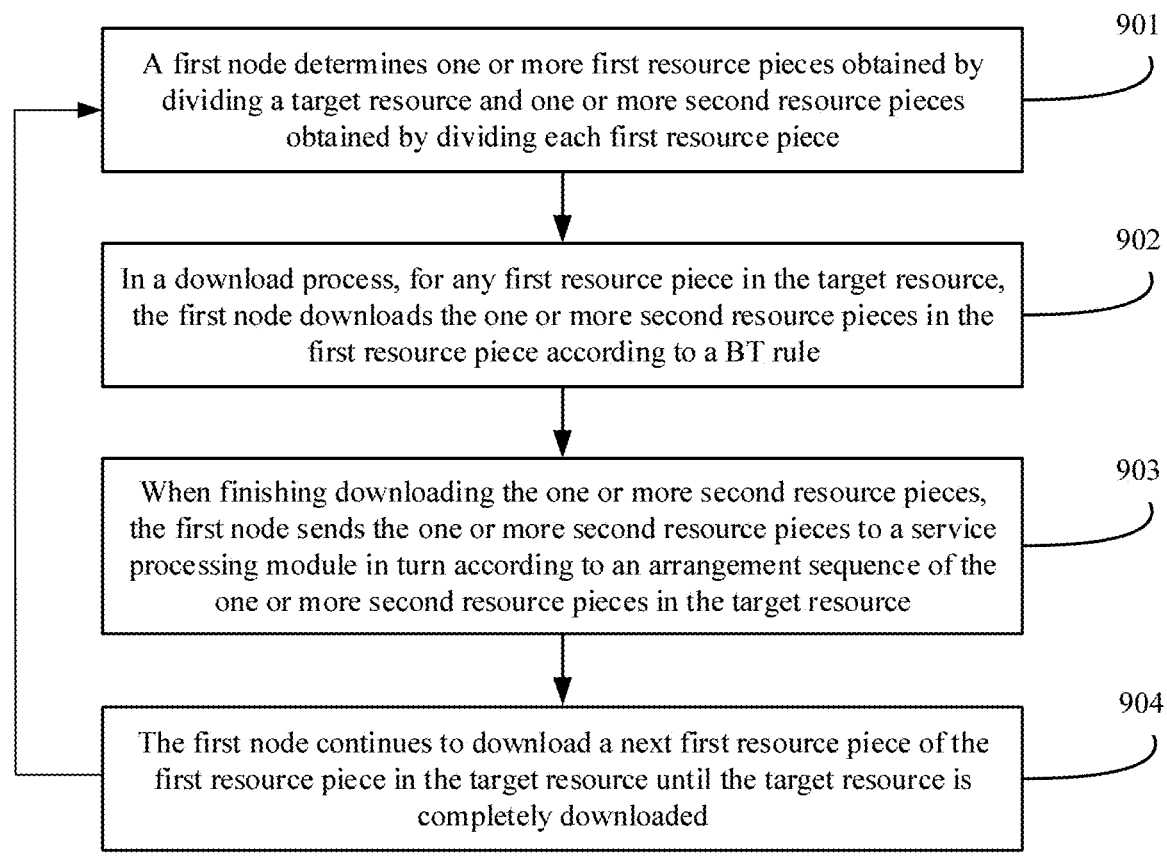
FIG. 9 is a flowchart of a resource download method according to an embodiment of this application.

FIG. 9 is a schematic flowchart of a resource download method according to an embodiment of this application. The method is performed by a first node, and the method includes the following steps.

Step 901: The first node determines one or more first resource pieces obtained by dividing a target resource and one or more second resource pieces obtained by dividing each first resource piece.

The first resource piece may be considered as a large piece obtained by dividing a resource. Each resource may be divided into one or more first resource pieces, and a size of the first resource piece may be set based on a service requirement. For example, a size of each first resource piece may be 512 M. Each first resource piece may include 128 second resource pieces.

The second resource piece, namely, a piece, may be considered as a small piece obtained by dividing the large piece. Each first resource piece may be divided into one or more second resource pieces, and a size of the second resource piece may be set based on a service requirement. For example, a size of each first resource piece may be 1 M.

In a possible design, the size of the first resource piece may be positively related to a size of a resource. To be specific, if the resource is relatively large, the first resource piece obtained by dividing the resource is also relatively large. If the resource is relatively small, the first resource piece obtained by dividing the resource is also relatively small.

In a possible design, for a size relationship between the first resource piece and the second resource piece, a proportion between the size of the first resource piece and the size of each second resource piece falls within a preset proportion range. For example, it may be set that the size of the first resource piece is approximately 100 times the size of the second resource piece.

For example, a process of determining a division manner of the first resource piece may include the following implementations 1 and 2.

Implementation 1: The first node determines, based on preset configuration information, at least one first resource piece obtained by dividing the target resource.

The preset configuration information is used to indicate the division manner of the first resource piece, for example, may include the size of the first resource piece. The first node may determine, based on the preset configuration information, the at least one first resource piece obtained by dividing the target resource. The preset configuration information may be prestored on the first node, and specific content of the preset configuration information may be set based on a service requirement.

For example, it is assumed that the preset configuration information indicates that the size of the first resource piece is 512 M. In this case, the first node may use the first 512 M of the target resource as the 1st first resource piece, use the second 512 M of the target resource as the 2nd first resource piece, and so on.

Implementation 2: The first node receives a configuration instruction sent by a tracking node, and determines, based on the configuration instruction, the at least one first resource piece obtained by dividing the target resource.

In this implementation, the tracking node may configure a manner of dividing the first resource piece by the first node. Further, the tracking node may send the configuration instruction to the first node. The configuration instruction is used to indicate the division manner of the first resource piece. The first node may receive the configuration instruction, and determine, based on the configuration instruction, the at least one first resource piece obtained by dividing the target resource.

Step 902: In a download process, for any first resource piece in the target resource, the first node downloads the one or more second resource pieces in the first resource piece according to a BT rule.

The BT rule may be a general rule of a BT protocol. The first node may select a to-be-downloaded second resource piece from the first resource piece and download the second resource piece from a second node according to the BT rule. For example, the BT rule may include the following (1) to (4).

(1) A strict priority rule: After the first node downloads any slice in a piece from any second node, when the first node needs to download another slice in the piece, the first node also downloads the other slice from the second node, to ensure that the first node downloads a complete piece as soon as possible.

(2) A fewest-first rule: If a piece has a lowest owning rate (fewest pieces are owned) by all second nodes, the first node preferably downloads the piece. The fewest-first rule has the following effect. First, it can be prevented that a second node that has the piece suddenly leaves, resulting in that the piece is missing and that a second node that currently downloads a resource corresponding to the piece cannot download a complete file. Second, if the first node downloads some pieces that have a relatively low owning rate, many other second nodes request for data from the first node. To download the data from the first node, the second nodes need to provide data for the first node to download. This also helps improve a download speed of the first node. For an entire P2P system, the piece that has a lower owning rate is preferably downloaded. This can improve an owning rate, on each piece, of the entire P2P system, and the entire P2P system tends to be optimal. If all the second nodes preferably download a piece that has a higher owning rate, owning rates of some pieces are further reduced. Once a second node that has pieces with a low owning rate leaves a sharing system, an entire file becomes increasingly incomplete. Finally, many second nodes cannot download the complete file.

(3) A rule for randomly selecting the first to-be-downloaded piece: When the first node starts downloading, it is assumed that the fewest-first rule is used. In this case, if a piece has a very low owning rate, it is relatively difficult to download the piece. However, if the first node randomly selects a piece, the piece is more likely downloaded. Once the first node downloads a complete piece, the piece may be provided for another second node to download. Because the first node uploads data to the other second node, the other second node unblocks the first node. This helps ensure a relatively high download speed in an initial phase.

(4) A final-phase rule: When the first node almost completes downloading, if the first node takes a long time period to download a piece from a second node that has a very low transmission speed, the first node cannot complete downloading in a timely manner. In this case, the final-phase rule may be used. The first node sends a request for some slices of the piece to all the second nodes. Once receiving a slice sent by a second node, the first node sends a cancel message to another second node, and downloads the slice only from the current second node.

The second resource piece is selected and downloaded according to the BT rule, to implement out-of-order download. Further, for any first resource piece, when the first node downloads a plurality of second resource pieces in the first resource piece, a download sequence of the plurality of second resource pieces may be different from an arrangement sequence of the plurality of second resource pieces. For example, it is assumed that the first resource piece includes three pieces. The third piece may be first downloaded, then the second piece is downloaded, and then the first piece is downloaded.

In this embodiment, at least the following technical effects may be achieved through the out-of-order download.

(1) A distribution capability of a P2P network can be improved. According to the method provided in this embodiment, the first node may download different second resource pieces from a plurality of second nodes in the P2P network at the same time. That is, the first node may download, in parallel, pieces from a plurality of peers. For example, the first node downloads a piece 1 from a peer A, downloads a piece 2 from a peer B, and downloads a piece 3 from a peer C at the same time. Compared with a manner in which the piece 1 is downloaded first, then the piece 2 is downloaded, and then the piece 3 is downloaded, downloading the three pieces at the same time may greatly speed up resource download and improve resource download efficiency.

(2) A TCP duplex channel between peers may be fully utilized. According to the method provided in this embodiment, the first node may perform full-duplex communication with the second node. To be specific, when downloading any piece from the second node, the first node sends another piece to the second node. This speeds up resource transmission in the entire P2P network and improves resource transmission efficiency of the entire P2P network.

Step 903: When finishing downloading the one or more second resource pieces, the first node sends the one or more second resource pieces to a service processing module in turn according to an arrangement sequence of the one or more second resource pieces in the target resource.

The service processing module is configured to process a service, and one or more instructions for processing the service are encapsulated in the service processing module. The service processing module may be implemented by various program execution units such as a process, an object, a method, an application, a function, a thread, and a client. In an example of a scenario, with reference to an image distribution service, the service processing module may be a client of a container engine, for example, a DOCKER client. In another example of a scenario, with reference to a streaming media service, the target resource may be streaming media data, and the resource processing module may be a player.

In this embodiment, for any first resource piece in the target resource, after all second resource pieces in the first resource piece are downloaded, the first node may sort all the second resource pieces according to an arrangement sequence of the second resource pieces in the target resource, and send all the sorted second resource pieces to the service processing module in turn such that the service processing module processes the second resource pieces in turn.

Figure 10:
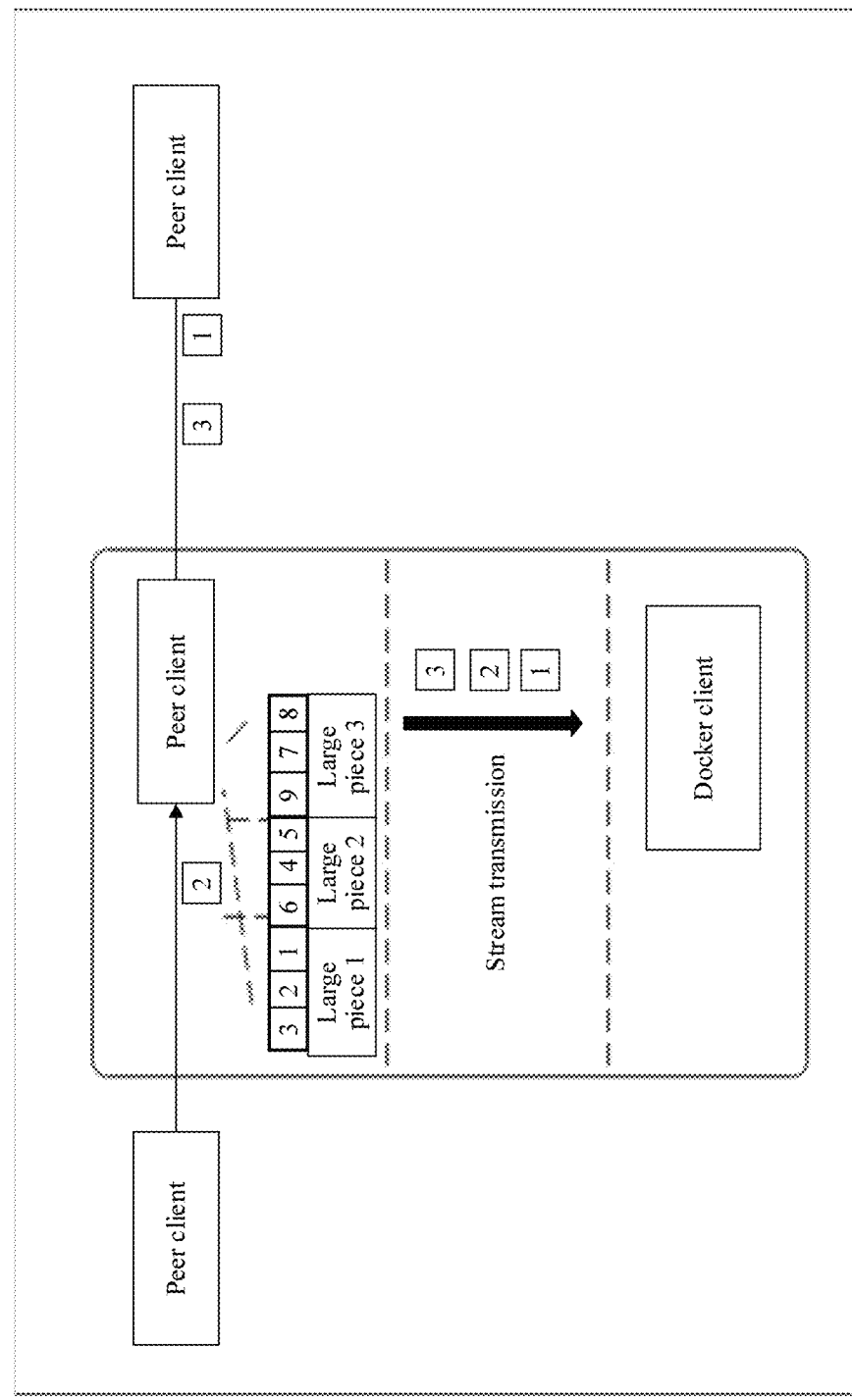
FIG. 10 is a schematic diagram of resource download according to an embodiment of this application.

For example, referring to FIG. 10, the target resource is divided into three large pieces (the large piece is the first resource piece), and each large piece is divided into three pieces. A large piece 1 is divided into a piece 1, a piece 2, and a piece 3. A large piece 2 is divided into a piece 4, a piece 5, and a piece 6. A large piece 3 is divided into a piece 7, a piece 8, and a piece 9. A peer client and the DOCKER client run on a peer node. When downloading the large piece 1, the peer client may download the piece 2 from a left peer node and download the piece 1 and the piece 3 from a right peer node. After finishing downloading the piece 1, the piece 2, and the piece 3, the peer client sequentially sends the piece 1, the piece 2, and the piece 3 to the DOCKER client such that the DOCKER client sequentially receives and processes, in turn, the piece 1, the piece 2, and the piece 3.

In a possible design, in a process in which the first node sends the second resource pieces to the service processing module in turn, after downloading all the second resource pieces in the first resource piece, the first node may sort all the second resource pieces according to the arrangement sequence of the second resource pieces in the target resource, and then send at least one sorted second resource piece to the service processing module. For a sorting process, in a possible implementation, index data of each second resource piece may be determined. The index data is used to indicate a location, of a corresponding second resource piece, in the target resource, and may be a piece index. The first node may sort at least one second resource piece based on the index data of each second resource piece, for example, sort the at least one second resource piece according to a size of the index data.

Step 904: The first node continues to download a next first resource piece of the first resource piece in the target resource until the target resource is completely downloaded.

After the first node finishes downloading any first resource piece, the first node determines the next first resource piece of the first resource piece in the target resource, and downloads a plurality of second resource pieces in the next first resource piece according to the BT rule until the next first resource piece is completely downloaded. Then the first node sends each second resource piece in the next first resource piece to the service processing module in turn. By analogy, the entire target resource piece may be completely downloaded.

For example, when the peer client starts to download the first large piece, the peer client downloads, in parallel, the piece 1, the piece 2, and the piece 3 in an out-of-order manner. After finishing downloading the piece 1, the piece 2, and the piece 3, the peer client sequentially sends the piece 1, the piece 2, and the piece 3 to the DOCKER client. In this way, the DOCKER client obtains the first large piece. Then, the peer client starts to download the second large piece, and also downloads, in parallel, the piece 4, the piece 5, and the piece 6 in the out-of-order manner. After finishing downloading the piece 4, the piece 5, and the piece 6, the peer client sequentially sends the piece 4, the piece 5, and the piece 6 to the DOCKER client. In this way, the DOCKER client obtains the second large piece. The rest may be deduced by analogy.

It should be noted that, according to the foregoing processing logic for downloading the resource piece, in a process in which the first node downloads the resource piece from one or more peer nodes in the P2P network in the out-of-order manner, the first node can synchronize a downloaded resource piece to the service processing module. Further, the first node may perform, in parallel, a process of downloading the resource piece and a process of sending the resource piece to the service processing module. Each time the first node finishes downloading one first resource piece, the first node may send a second resource piece in the first resource piece to the service processing module without waiting for complete download of a next first resource piece. In this way, the service processing module can process each downloaded resource piece in time. For example, the DOCKER client may download each piece in the second large piece when sequentially sending pieces in the first large piece to the peer client. In this way, downloading the piece and sending the piece are performed at the same time. This can greatly improve the resource download efficiency.

The following further describes effects of some sequence rules provided in this embodiment of this application.

In a related technology, pieces are usually distributed in an absolute sequence in a streaming media P2P network. Further, the peer node needs to download, in turn, each piece according to an arrangement sequence of pieces in a resource. Each time the peer node downloads a piece, the peer node sends the piece to the service processing module. In this way, the peer node sends all the pieces to the service processing module in turn.

A streaming service is used as an example. The peer node installs a BT client and a player. The BT client is used to download streaming media data on the P2P network, and the player is used to play the streaming media data downloaded by the BT client. In a process of downloading any streaming media data, after determining a plurality of pieces obtained by dividing the streaming media data, the BT client uses the first piece in the streaming media data as a to-be-downloaded piece. The BT client determines, from the P2P network, a peer node that has the first piece, downloads the first piece from the peer node, and sends the first piece to the player. Then, the BT client uses the second piece in the streaming media data as a to-be-downloaded piece. The BT client determines, from the P2P network, a peer node that has the piece, downloads the second piece from the peer node, and sends the second piece to the player. By analogy, sequential download is performed strictly according to an arrangement sequence of pieces in a resource such that the player can receive each piece in the streaming media data in turn, to continuously and correctly play the streaming media data.

However, when the foregoing solution is used to download the target resource, first, a super node needs to be disposed in the streaming media P2P network. The super node is a node that obtains a resource from a source node and provides the resource to each first-level node in the P2P network. Consequently, deployment of the streaming media P2P network is relatively complex. Second, the streaming media P2P network is a tree network. To be specific, a path from a root node to each leaf node is unique. In addition, a resource can only be unidirectionally transmitted from the root node to each leaf node, but cannot be transmitted from the leaf node to the root node.

Figure 11:
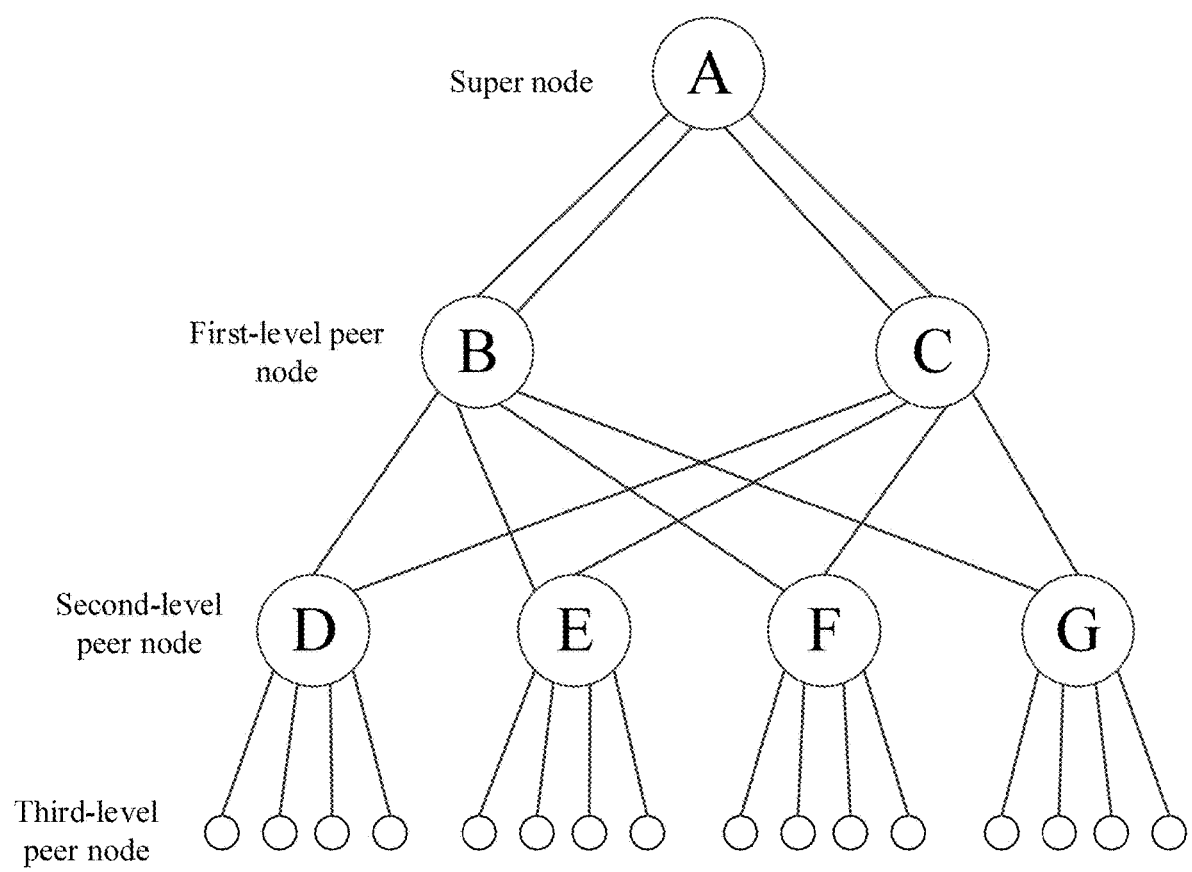
FIG. 11 is a schematic diagram of a network topology of a streaming media P2P network in a related technology.

For example, FIG. 11 is a schematic diagram of a streaming media P2P network in a related technology. In the streaming media P2P network, a first layer network is a primary node. A second layer network is connected to the primary node, and includes a peer node 1 and a peer node 2. A third layer network is connected to the second layer network, and includes a peer node 3, a peer node 4, a peer node 5, and a peer node 6. The resource can only be transmitted unidirectionally in the streaming media P2P network. To be specific, the resource can only be transmitted from an upper-layer network to a lower-layer network, but cannot be transmitted from the lower-layer network to the upper-layer network. Therefore, the TCP duplex channel between the peers cannot be fully utilized. Consequently, it takes a long time period to download the target resource, and efficiency is very low.

However, in this embodiment of this application, first, all first resource pieces in the target resource are sequentially downloaded. That is, the first large piece is first downloaded, and then the second large piece is downloaded. Therefore, based on this, different second resource pieces in a same resource piece are sequentially sent to the service processing module. For example, different pieces in the large piece are sequentially sent to the DOCKER client. Then, the service processing module sequentially receives all second resource pieces. That is, a sequence of the pieces received by the service processing module is exactly an arrangement sequence of the pieces in a resource. Therefore, the service processing module processes all the received pieces in turn to ensure correctness of a service processing result.

Second, native processing logic of the P2P network is modified, and pieces are downloaded in the out-of-order manner. This can speed up overall distribution, to quickly distribute a large quantity of resources through the P2P network. In an image distribution service in a public cloud, this can resolve a problem that when a large quantity of images are distributed, an image distribution rate is low.

Figure 12:
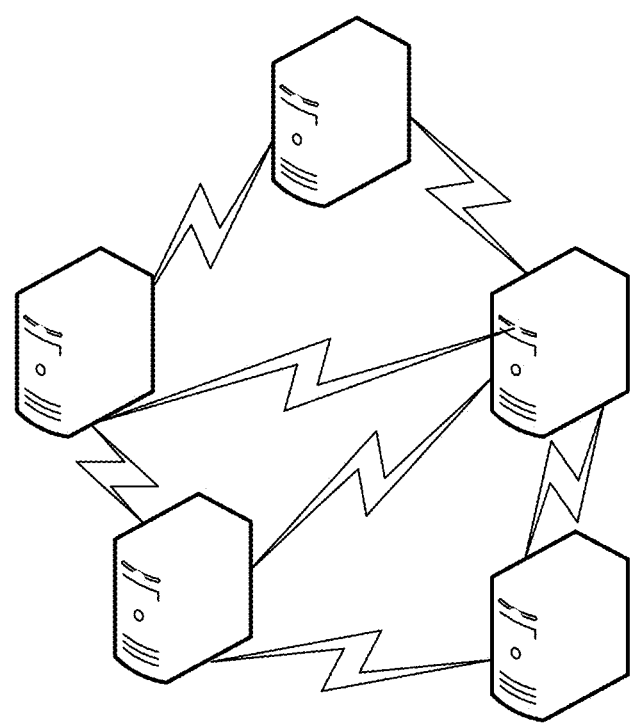
FIG. 12 is a schematic diagram of a network topology of a P2P network according to an embodiment of this application.

Third, the P2P network provided in this embodiment of this application is of a mesh structure. FIG. 12 is a schematic diagram of a topology structure of the P2P network according to an embodiment of this application. Different peer nodes in the P2P network may be randomly connected to each other. Any link in the mesh structure is used to bidirectionally transmit a resource. Any link in the P2P network may be a TCP duplex channel. Both uplink transmission and downlink transmission of the resource may be implemented such that a transmission advantage of the TCP duplex channel between the peers may be fully utilized.

Fourth, the super node does not need to be disposed in the P2P network provided in this embodiment of this application. The target resource may be directly distributed from the source node to each peer node, and a deployment structure is relatively simple.

Figure 13:
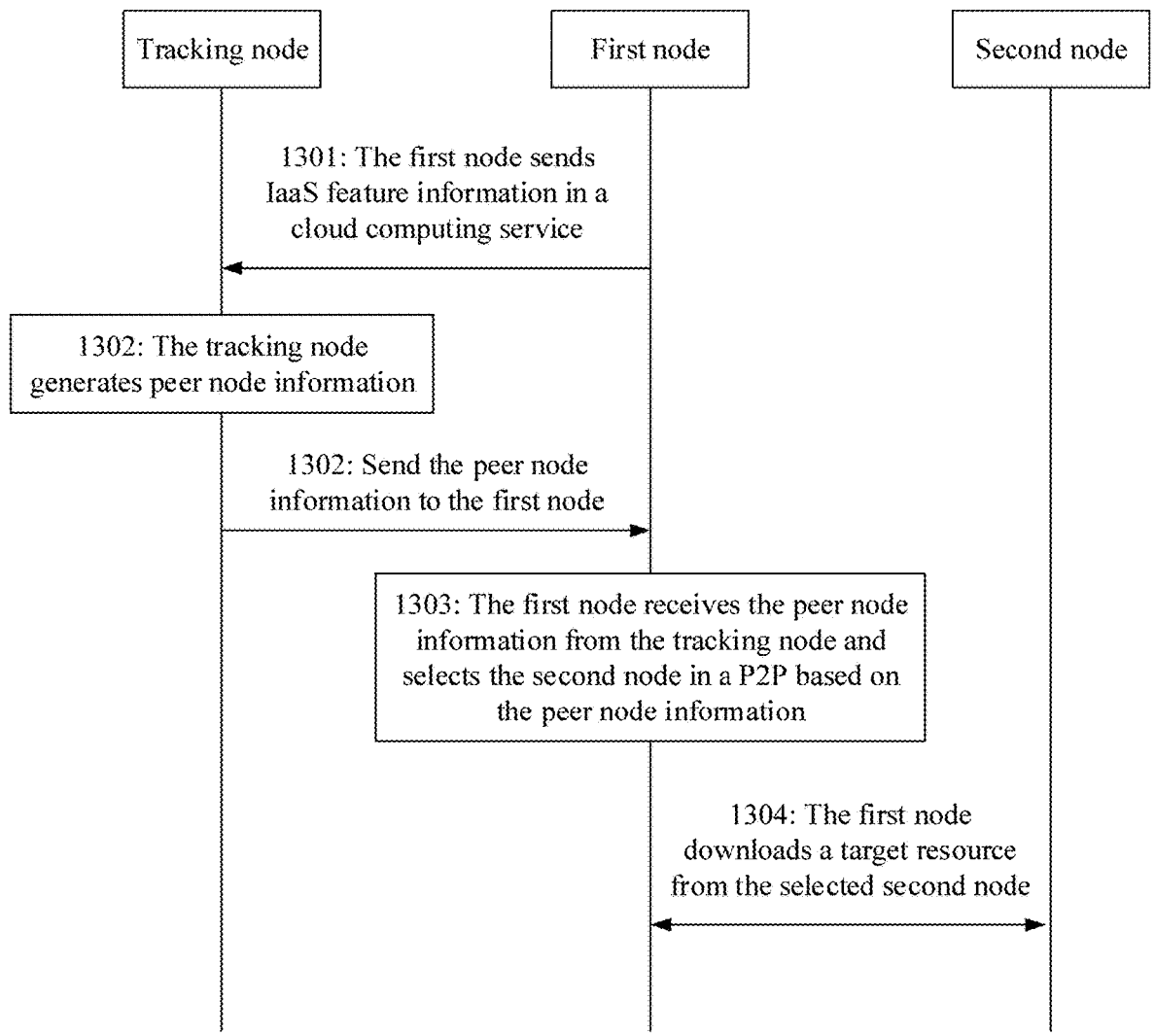
FIG. 13 is a flowchart of a resource download method according to an embodiment of this application.

FIG. 13 is a flowchart of a resource download method according to an embodiment of this application. Interaction bodies of the method include a first node, a second node, and a tracking node. The method includes the following steps.

Step 1301: The first node sends IaaS feature information, of the first node, in a cloud computing service to the tracking node in a P2P network.

An IaaS feature is a feature, of the first node, in terms of infrastructure of the cloud computing service, and may describe an attribute of the first node in each dimension in an architecture system of an equipment room. The IaaS feature may be a host machine on which the first node is located, an equipment room in which the first node is located, a rack on which the first node is located, a cluster to which the first node belongs, or the like.

Further, a cloud computing service provider usually deploys a large quantity of infrastructure devices hierarchically in accordance with a specific architecture system of the equipment room, to organize and structure the large quantity of infrastructure devices. The large quantity of well-deployed infrastructure devices may provide the cloud computing service to a large quantity of users. For example, a plurality of equipment rooms may be deployed in one region, a plurality of racks may be deployed in one equipment room, a plurality of hosts may be deployed on one rack, and a plurality of virtual machines may be deployed on one host. In this way, "region-equipment room-rack-host-virtual machine" forms an architecture system of an equipment room in a public cloud. Correspondingly, an attribute, of the first node, in terms of the architecture system of the equipment room may be described using the host machine on which the first node is located, the equipment room in which the first node is located, the rack on which the first node is located, and the cluster to which the first node belongs.

The IaaS feature information is used to indicate the IaaS feature, and may include at least one of a host identifier, an equipment room identifier, a rack identifier, and a cluster identifier. The host identifier is used to identify the host machine on which the first node is located, and may be a host identifier (ID). The equipment room identifier is used to identify the equipment room in which the first node is located, and may be a high availability zone (AZ) ID. The rack identifier is used to identify the rack on which the first node is located, and may be a rack ID. The cluster identifier is used to identify the cluster to which the first node belongs, and may be a cluster ID.

For a specific process of obtaining the IaaS feature information by the first node, in a possible implementation, the first node may query a CMDB system to obtain the IaaS feature information. The CMDB system may store a host identifier, an equipment room identifier, a rack identifier, and a cluster identifier that correspond to each peer node in the P2P network such that any peer node may query the host identifier, the equipment room identifier, the rack identifier, and the cluster identifier in the CMDB system.

In addition, the first node may alternatively obtain the IaaS feature information in another manner. For example, the IaaS feature information may be prestored on the first node. For another example, IaaS feature information of each peer in the P2P network may be stored on one or more storage nodes in a cloud storage system such that the first node obtains the IaaS feature information from the cloud storage system through wired or wireless network connection. For another example, the IaaS feature information of each peer in the P2P network may be stored in a nonvolatile storage medium such as a hard disk such that the first node obtains the IaaS feature information by reading the nonvolatile storage medium. In this embodiment, a manner of obtaining the IaaS feature information by the first node is not limited.

For a specific process of sending the IaaS feature information by the first node, with reference to an example of the IaaS feature information, the first node may send the at least one of the host identifier, the equipment room identifier, the rack identifier, and the cluster identifier to the tracking node. In a possible implementation, when the first node sends an obtaining request for a target resource, the obtaining request for the target resource may carry the at least one of the host identifier, the equipment room identifier, the rack identifier, and the cluster identifier. The first node sends the obtaining request for the target resource to the tracking node. That is, the first node sends the host identifier, the equipment room identifier, the rack identifier, and the cluster identifier to the tracking node, and notifies the tracking node that the first node needs to obtain the target resource.

Step 1302: The tracking node receives the IaaS feature information of the first node, generates peer node information, and sends the peer node information to the first node.

Further, the tracking node may receive the at least one of the host identifier, the equipment room identifier, the rack identifier, and the cluster identifier. For example, the tracking node may receive the obtaining request for the target resource, and parse the obtaining request for the target resource to obtain the at least one of the host identifier, the equipment room identifier, the rack identifier, and the cluster identifier. In this way, the IaaS feature information of the first node is obtained.

The peer node information is used to indicate one or more peer nodes that downloads or download the target resource in the P2P network, and may be represented using a list, an array, a set, or another data structure. The peer node information includes one or more node identifiers, for example, may include an IP address and a port number of one node or IP addresses and port numbers of more nodes, to indicate a corresponding peer node using the IP address and the port number.

For a process of generating the peer node information by the tracking node, each peer node in the P2P network may send the IaaS feature information to the tracking node, and the tracking node may receive and store the IaaS feature information of each peer node. When the IaaS feature information of the first node is received, an identifier of a node that matches the IaaS feature information of the first node may be added to the peer node information based on a matching degree between the IaaS feature information of each peer node and the IaaS feature information of the first node, to generate the peer node information.

Further, with reference to an example of the IaaS feature information, the process of generating the peer node information may include one or a combination of a plurality of the following (1) to (4).

(1) The tracking node may determine, based on an identifier of a host machine on which each peer node is located and an identifier of the host machine on which the first node is located, a node that is on a same host machine as the first node, to obtain a first type of node, and add an identifier of the first type of node to the peer node information. For example, a host ID of each peer node may be determined, and an IP address of a peer node that has a same host ID as the first node is added to the peer node information.

(2) The tracking node may determine, based on an identifier of a rack on which each peer node is located and an identifier of the rack on which the first node is located, a node that has a same rack as the first node, to obtain a second type of node, and add an identifier of the second type of node to the peer node information. For example, a rack ID of each peer node may be determined, and an IP address of a peer node that has a same rack ID as the first node is added to the peer node information.

(3) The tracking node may determine, based on an identifier of an equipment room in which each peer node is located and an identifier of the equipment room in which the first node is located, a node that has a same equipment room as the first node, to obtain a third type of node, and add an identifier of the third type of node to the peer node information. For example, an AZ ID of each peer node may be determined, and an IP address of a peer node that has a same AZ ID as the first node is added to the peer node information.

(4) The tracking node may determine, based on an identifier of a cluster to which each peer node belongs and an identifier of the cluster to which the first node belongs, a node that has a same cluster as the first node, to obtain a fourth type of node, and add an identifier of the fourth type of node to the peer node information. For example, a cluster ID of each peer node may be determined, and an IP address of a peer node that has a same cluster ID as the first node is added to the peer node information.

In this embodiment, a priority of one node identifier or priorities of more node identifiers in the peer node information may correspond to a matching degree between a corresponding node and the IaaS feature information of the first node. The more IaaS feature information of a peer node matches the IaaS feature information of the first node (the closer the peer node is to the first node), the higher a priority is. This ensures that the peer node information matches the architecture system of the equipment room in the public cloud and a feature of each peer node in the public cloud.

Further, for any peer node in the P2P network, if the peer node and the first node are located on a same host machine (the peer node and the first node are different virtual machines on the same host machine), the peer node has a highest priority in the peer node information. If the peer node and the first node are not located on the same host machine but located on a same rack, the peer has a higher priority in the peer node information. If the peer node and the first node are not located on the same rack but located in a same equipment room, the peer has a high priority in the peer node information. If the peer node and the first node are not located on in the same equipment room but located in different equipment rooms, the peer has a lowest priority in the peer node information.

That is, a priority rule is introduced for the peer node information. The IP address of the peer node that has the same host ID as the first node is preferably returned. Then the IP address of the peer node that has the same AZ ID as the first node is returned. Finally, an IP address of a peer node that crosses an AZ is returned.

Figure 14:
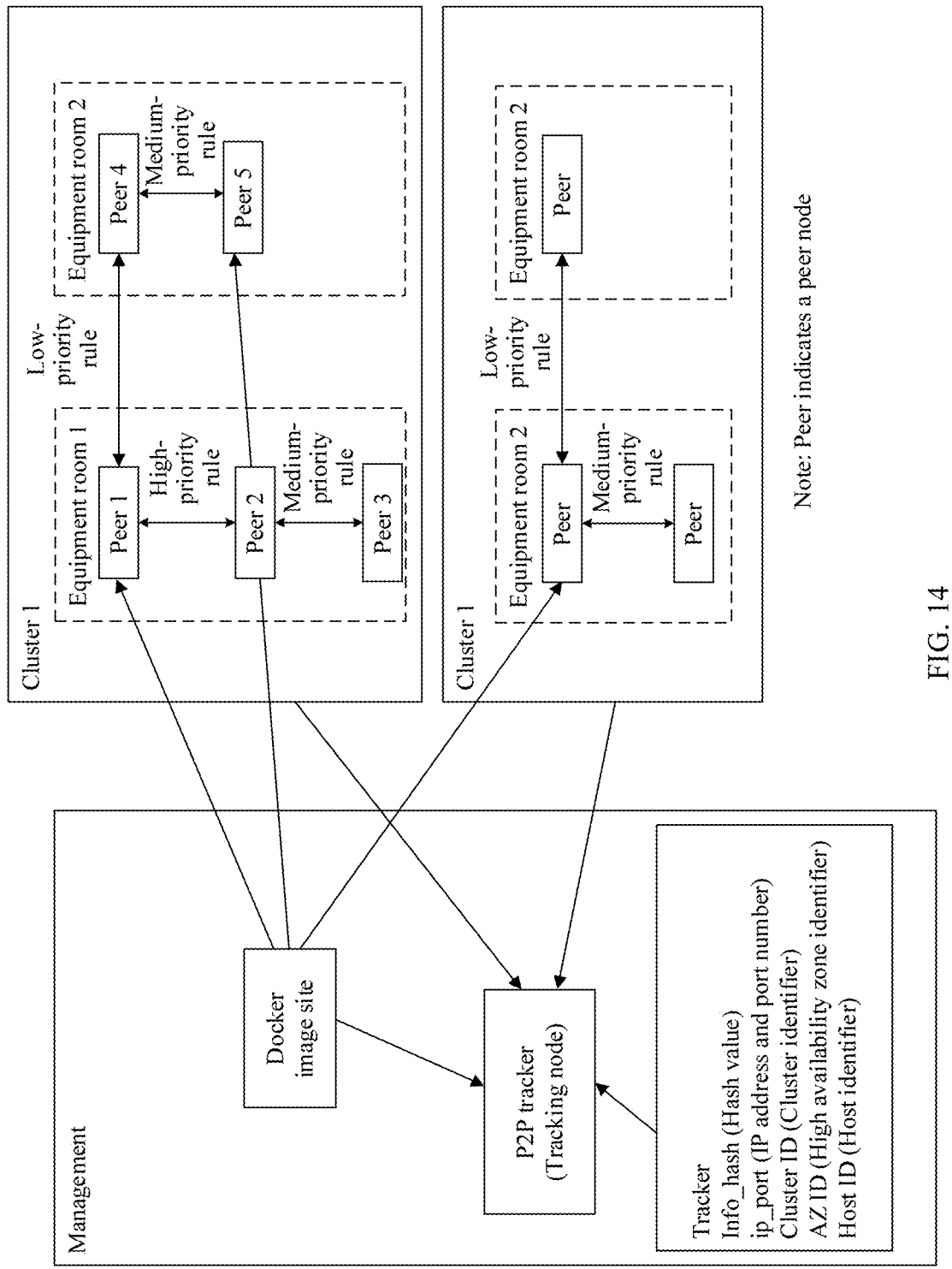
FIG. 14 is a schematic diagram of a priority rule according to an embodiment of this application.

In an example of a scenario, FIG. 14 is a schematic diagram of a priority rule according to an embodiment of this application. In a cluster 1, both a peer 1 and a peer 2 are located on a host 01. That is, the peer 1 and the peer 2 are located on a same host machine. In this case, there is a high-priority rule between the peer 1 and the peer 2. The peer 1 downloads a resource from the peer 2 first, and the peer 2 also downloads a resource from the peer 1 first. The peer 2 and a peer 3 are located on different hosts but located in a same equipment room 1. In this case, there is a medium-priority rule between the peer 2 and the peer 3. Then the peer 2 downloads a resource from the peer 3. The peer 1 and a peer 4 are located in different equipment rooms. In this case, there is a low-priority rule between the peer 1 and the peer 4. The peer 1 finally considers to download a resource from the peer 4.

The following describes effects of the priority rule provided in this embodiment of this application.

In a related technology, the architecture system of the equipment room in the public cloud is not considered, and the peer node information is irrelevant to a host, a rack, and an equipment room to which a peer node belongs. Consequently, when a data center provides the cloud computing service, the following cases often occur. First, for any virtual machine, even if another virtual machine that is located on a same host machine as the virtual machine already has a resource, the virtual machine still often downloads a resource from another host machine, resulting in low efficiency. In addition, if the other host machine is located in a different equipment room, a traffic resource is wasted. Second, for any virtual machine, even if another host machine that is located in a same equipment room as the virtual machine already has a resource, the virtual machine still often crosses the equipment room to download a resource from a host machine in another equipment room, resulting in egress traffic of the equipment room. Egress traffic volume of the equipment room is a key factor that determines running costs of the data center. Consequently, when the data center provides the cloud computing service, the running costs are high, which is not applicable to an actual service scenario of the public cloud.

The priority rule provided in this embodiment of this application is applicable to the public cloud. That the priority rule is applied to the first node is used as an example. The first node preferably obtains the target resource from another peer node that is on a same host machine as the first node. Then, the first node preferably obtains the target resource from another peer node that is on a same rack as the first node. Then, the first node preferably obtains the target resource from another peer node that is in a same equipment room as the first node. Last, the first node crosses an equipment room to obtain the target resource from a peer node in another equipment room. In this way, the target resource is obtained nearby. This ensures that a local peer node is preferably used, to minimize cross-host and cross-equipment room network traffic.

For differentiation and description, priorities of peer nodes on a same host machine is described as a first priority, priorities of peer nodes on a same rack is described as a second priority, priorities of peer nodes in a same equipment room is described as a third priority, and priorities of peer nodes in different equipment rooms is described as a fourth priority. Correspondingly, in the P2P network, a peer node that is located on the same host machine as the first node is described as the first type of node, a peer node that is located on the same rack as the first node is described as the second type of node, a peer node that is located in the same equipment room as the first node is described as the third type of node, and a peer node that is located in a different equipment room from the first node is described as the fourth type of node. In this case, the identifier, of the first type of node, in the peer node information has the first priority. The identifier, of the second type of node, in the peer node information has the second priority. The identifier, of the third type of node, in the peer node information has the third priority.

The identifier, of the fourth type of node, in the peer node information has the fourth priority.

The priority is used to indicate a priority of selecting the corresponding node by the first node. The first priority, the second priority, the third priority, and the fourth priority are sorted in descending order.

In a possible implementation, a priority of the corresponding node may be indicated using a location of the node identifier in the peer node information. To be specific, identifiers of the peer nodes on the same host machine may be placed at the forefront of the peer node information. Identifiers of the peer nodes on the same rack may be placed after the identifiers of the peer nodes on the same host machine. Identifiers of the peer nodes in the same equipment room may be placed after the identifiers of the peer nodes on the same rack. Identifiers of the peer nodes in different equipment rooms may be placed after the identifiers of the peer nodes in the same equipment room. That is, the identifiers of the peer nodes in different equipment rooms may be placed at the end of the peer node information. A priority of each node corresponding to each node identifier may be indicated based on a sequence of node identifiers.

For differentiation and description, for example, the peer node information includes four locations. The four locations, from front to back, are a first preset location, a second preset location, a third preset location, and a fourth preset location. The identifier, of the first type of node, in the peer node information is located at the first preset location. The identifier, of the second type of node, in the peer node information is located at the second preset location. The identifier, of the third type of node, in the peer node information is located at the third preset location. The identifier, of the fourth type of node, in the peer node information is located at the fourth preset location. This ensures that the first node preferably selects the local peer node based on a location of an identifier, of each node, in the peer node information (according to the priority rule provided in this application) to download the target resource.

In a possible design, a quantity of primary nodes in the peer node information may be set to be not less than a specified quantity. The primary node is a node that has a complete target resource in the P2P network, namely, a peer node that finishes downloading the target resource. The primary node is also referred to as a seeder node. For example, the node that has the complete target resource is referred to as a fifth type of node. A quantity of identifiers, of the fifth type of node, in the peer node information is not less than a preset quantity. The preset quantity may be set based on a service requirement, for example, may be 2. In this case, each piece of peer node information includes at least two primary nodes.

In a possible design, with reference to a cluster in which peer nodes are located, the peers may be grouped based on a cluster ID. In addition, an IP address is isolated and returned based on a dimension of the cluster ID. To be specific, a node corresponding to each node identifier in the peer node information is located in a same cluster as the first node. That is, the peer node information may include only an identifier of a peer node that is located in the same cluster as the first node, and does not include an identifier of a peer node that is located in a different cluster from the first node, to ensure that the first node downloads the target resource only from the peer node in the same cluster.

Step 1303: The first node receives the peer node information from the tracking node and selects the second node in the P2P based on the peer node information.

After the first node obtains the peer node information, because the peer node information indicates a priority for selecting a peer node, the first node may select one or more IP addresses from an IP address, of each node, in the peer node information based on the peer node information. The first node uses a peer node corresponding to the one or more IP addresses as the second node for obtaining the target resource.

A manner of selecting the second node may include the following (1) to (4).

(1) The first type of node is determined as one or more second nodes based on the peer node information.

To be specific, the first node preferably selects another peer node that is on the same host machine as the first node, to download the target resource from the other peer node that is on the same host machine as the first node.

In a possible implementation, the first node may determine the first type of node based on the location of the node identifier in the peer node information. For example, on the first node, it may be preset that the first preset location in the peer node information has a highest priority. In this case, the first node may determine, based on the first preset location, an identifier, of a node, located at the first preset location in the peer node information, to obtain an identifier of one node or identifiers of more nodes. The first node uses the one or more corresponding nodes as the first type of node.

(2) The second type of node is determined as the one or more second nodes based on the peer node information.

Further, then the first node preferably selects another peer node that is on the same rack as the first node, to download the target resource from the other peer node that is on the same rack as the first node.

In a possible implementation, the first node may determine the second type of node based on the location of the node identifier in the peer node information. For example, on the first node, it may be preset that the second preset location in the peer node information has a second highest priority. In this case, the first node may determine, based on the second preset location, an identifier, of a node, located at the second preset location in the peer node information, to obtain an identifier of one node or identifiers of more nodes. The first node uses the one or more corresponding nodes as the second type of node.

(3) The third type of node is determined as the one or more second nodes based on the peer node information.

Further, then the first node preferably selects another peer node that is in the same equipment room as the first node, to download the target resource from the other peer node that is in the same equipment room as the first node.

In a possible implementation, the first node may determine the third type of node based on the location of the node identifier in the peer node information. For example, on the first node, it may be preset that the third preset location in the peer node information has a third highest priority. In this case, the first node may determine, based on the third preset location, an identifier, of a node, located at the third preset location in the peer node information, to obtain an identifier of one node or identifiers of more nodes. The first node uses the one or more corresponding nodes as the third type of node.

(4) The fourth type of node is determined as the one or more second nodes based on the peer node information.

Further, the first node finally selects another peer node that is in a different equipment room from the first node, to download the target resource from the other peer node that is in the different equipment room from the first node.

In a possible implementation, the first node may determine the fourth type of node based on the location of the node identifier in the peer node information. For example, on the first node, it may be preset that the fourth preset location in the peer node information has a fourth highest priority. In this case, the first node may determine, based on the fourth preset location, an identifier, of a node, located at the fourth preset location in the peer node information, to obtain an identifier of one node or identifiers of more nodes. The first node uses the one or more corresponding nodes as the fourth type of node.

Step 1304: The first node downloads the target resource from the selected second node.

According to the method provided in this embodiment, with reference to an architecture system of an equipment room in the cloud computing service, the priority rule is designed for the peer node in the P2P network. The first node preferably obtains the target resource from another peer node that is on the same host machine as the first node. Then, the first node preferably obtains the target resource from another peer node that is on the same rack as the first node. Then, the first node preferably obtains the target resource from another peer node that is in the same equipment room as the first node. Last, the first node crosses the equipment room to obtain the target resource from a peer node in another equipment room. In this way, the target resource may be obtained nearby. This ensures that the local peer node is preferably used, to minimize the cross-host and cross-equipment room network traffic. In particular, the method is applicable to a DOCKER image distribution service in the public cloud. Each DOCKER machine in the public cloud may be deployed as a peer node. In this case, each DOCKER machine implements downloading an image layer using the P2P network, and can obtain the image layer nearby. This ensures that a peer node of a local device or the local peer node is preferably used, to minimize the cross-host and cross-equipment room network traffic.

Figure 15:
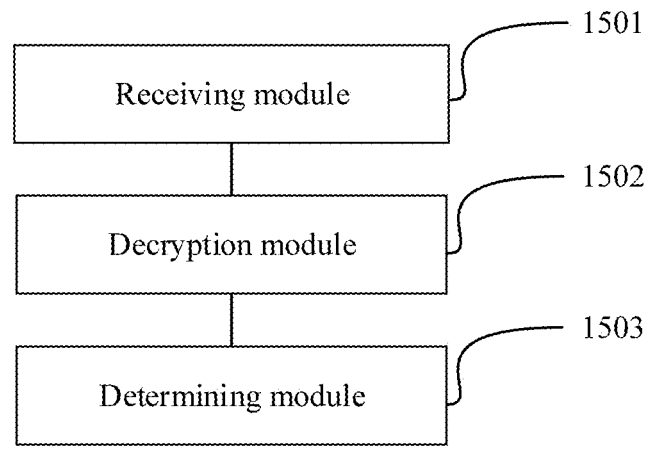
FIG. 15 is a schematic structural diagram of a resource obtaining apparatus according to an embodiment of this application.

FIG. 15 is a schematic structural diagram of a resource obtaining apparatus according to an embodiment of this application. As shown in FIG. 15, the apparatus includes a receiving module 1501, a decryption module 1502, and a determining module 1503.

The receiving module 1501 is configured to receive a first data packet from one second node or first data packets from more second nodes. One or more first data packets are obtained after a resource piece of the target resource is encrypted using a public key in a key pair. The key pair is used to encrypt the target resource between the first node and the one or more second nodes in a P2P network, and the key pair includes the public key and a private key.

The decryption module 1502 is configured to decrypt the one or more first data packets using the private key, to obtain one or more resource pieces of the target resource.

The determining module 1503 is configured to determine the target resource based on the one or more resource pieces.

Optionally, the key pair is used to encrypt one or more links for transmitting the target resource in the P2P network, and the one or more links are links between the first node and the one or more second nodes.

For any link between the first node and the one or more second nodes, when the first node receives any data packet over the link, the first node decrypts the data packet using the private key.

Optionally, the apparatus further includes a generation module (not shown) configured to generate an obtaining request for the target resource for any one of the one or more second nodes, an encryption module (not shown), used by the first node to encrypt the obtaining request using the public key, to obtain a second data packet, and a sending module (not shown) configured to send the second data packet to the second node.

Optionally, the apparatus further includes an obtaining module (not shown) configured to obtain a key pair corresponding to the target resource.

Optionally, the obtaining module is configured to receive a key pair of a tracking node in the P2P network, or receive a digital certificate of the tracking node in the P2P network, where the digital certificate carries an identifier of the target resource, and generate the key pair based on the digital certificate.

Optionally, the apparatus further includes a sending module (not shown) configured to send token data of an authentication node to the tracking node, where the token data is used to indicate that the first node has a permission to obtain the target resource.

Optionally, the apparatus further includes a sending module (not shown) configured to send the token data of the authentication node to the one or more second nodes, where the token data is used to indicate that the first node has the permission to obtain the target resource.

Optionally, the token data includes at least one permission identifier. The at least one permission identifier is used to indicate at least one permission of the first node on the target resource. The at least one permission includes the permission for obtaining the target resource.

Optionally, the sending module is configured to add a digital signature to the token data using the private key, to obtain a third data packet, and send the third data packet.

Optionally, the target resource is an image layer.

Optionally, the target resource is divided into one or more first resource pieces, and each first resource piece is divided into one or more second resource pieces.

The receiving module 1501 is further configured to in a download process, for any first resource piece in the target resource, download one or more second resource pieces in the first resource piece according to a BT rule.

The apparatus further includes a sending module (not shown) configured to, when finishing downloading the one or more second resource pieces, send the one or more second resource pieces to a service processing module in turn according to an arrangement sequence of the one or more second resource pieces in the target resource, where the receiving module 1501 is further configured to continue to download a next first resource piece of the first resource piece in the target resource until the target resource is completely downloaded.

Optionally, the apparatus further includes a sending module (not shown) configured to send IaaS feature information, of the first node, in a cloud computing service, where the receiving module 1501 is further configured to receive peer node information of the P2P network from the tracking node, where the peer node information includes one or more node identifiers, and one or more priorities of the one or more node identifiers in the peer node information corresponds or correspond a matching degree between a corresponding node and the IaaS feature information of the first node, and a selection module configured to select the one or more second nodes in the P2P network based on the peer node information, where the receiving module 1501 is further configured to download the target resource from the one or more selected second nodes.

Optionally, the selection module is configured to determine a first type of node as the one or more second nodes based on the peer node information, where the first type of node and the first node are located on a same host machine, and/or determine a second type of node as the one or more second nodes based on the peer node information, where the second type of node and the first node are located on a same rack, and/or determine a third type of node as the one or more second nodes based on the peer node information, where the third type of node and the first node are located in a same equipment room, and/or determine a fourth type of node as the one or more second nodes based on the peer node information, where the fourth type of node and the first node are located in a same region.

Optionally, an identifier, of the first type of node, in the peer node information has a first priority, and the first type of node and the first node are located on the same host machine, and/or an identifier, of the second type of node, in the peer node information has a second priority, and the second type of node and the first node are located on the same rack, and/or an identifier, of the third type of node, in the peer node information has a third priority, and the third type of node and the first node are located in the same equipment room, and/or an identifier, of the fourth type of node, in the peer node information has a fourth priority, and the fourth type of node and the first node are in the same region.

The first priority, the second priority, the third priority, and the fourth priority are used to indicate a priority of selecting the corresponding node by the first node. The first priority, the second priority, the third priority, and the fourth priority are sorted in descending order.

It should be noted that when the resource obtaining apparatus provided in this embodiment obtains a resource, only division of the foregoing function modules is used as an example for description. In actual application, the foregoing functions may be allocated, as required, to be completed by different function modules. That is, an internal structure of the first node is divided into different function modules to complete all or some of the described functions. In addition, the resource obtaining apparatus provided in this embodiment and the resource obtaining method embodiment belong to a same concept. For a specific implementation process of the apparatus, refer to the method embodiment. Details are not described herein again.

Figure 16:
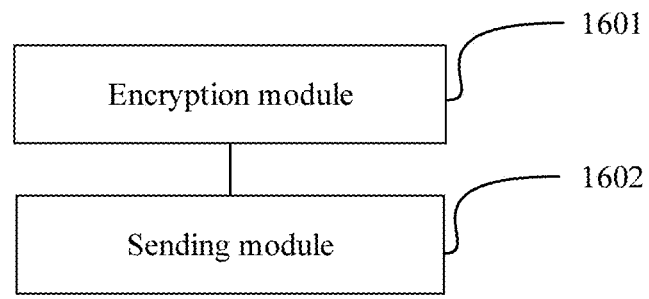
FIG. 16 is a schematic structural diagram of a resource distribution apparatus according to an embodiment of this application.

FIG. 16 is a schematic structural diagram of a resource distribution apparatus according to an embodiment of this application. As shown in FIG. 16, the apparatus includes an encryption module 1601 and a sending module 1602.

The encryption module 1061 is configured to encrypt a resource piece of a target resource using a public key in a key pair, to obtain a first data packet. The key pair is used to encrypt the target resource between the second node and one or more first nodes in a P2P network, and the key pair includes the public key and a private key.

The sending module 1602 is configured to send one or more first data packets to the one or more first nodes.

Optionally, the key pair is used to encrypt one or more links for transmitting the target resource in the P2P network, and the one or more links are links between the second node and the one or more first nodes.

The encryption module 1601 is further configured to for any link between the first node and the one or more second nodes, when any data packet that is to be transmitted over the link is generated, encrypt the data packet using the public key.

Optionally, the apparatus further includes an obtaining module configured to obtain a key pair corresponding to the target resource.

Optionally, the obtaining module is configured to receive a key pair of a tracking node in the P2P network, or receive a digital certificate of the tracking node in the P2P network, where the digital certificate carries an identifier of the target resource, and generate the key pair based on the digital certificate.

Optionally, the apparatus further includes a receiving module (not shown) configured to receive token data from the one or more first nodes, where the token data is used to indicate that a corresponding first node has a permission to obtain the target resource, and a determining module configured to determine, based on one or more pieces of token data, that the one or more first nodes has or have the permission to obtain the target resource.

Optionally, the token data includes at least one permission identifier. The at least one permission identifier is used to indicate at least one permission of the first node on the target resource. The at least one permission includes the permission for obtaining the target resource.

Optionally, the receiving module is configured to use the public key to verify a digital signature of the token data.

Optionally, the target resource is an image layer.

It should be noted that when the resource distribution apparatus provided in this embodiment distributes a resource, only division of the foregoing function modules is used as an example for description. In actual application, the foregoing functions may be allocated, as required, to be completed by different function modules. That is, an internal structure of the second node is divided into different function modules to complete all or some of the described functions. In addition, the resource distribution apparatus provided in this embodiment and the resource distribution method embodiment belong to a same concept. For a specific implementation process of the apparatus, refer to the method embodiment. Details are not described herein again.

Figure 17:
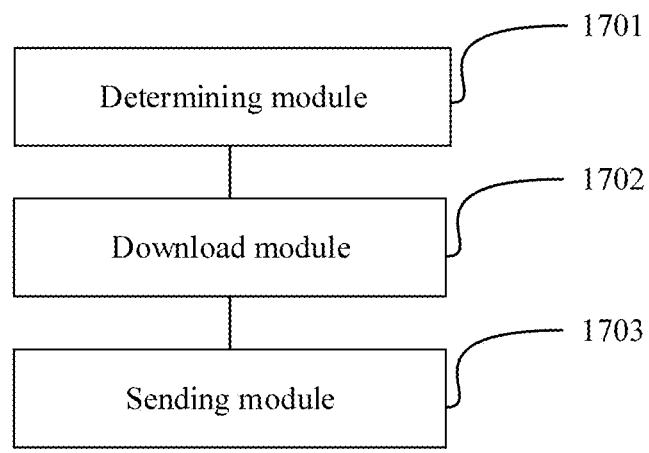
FIG. 17 is a schematic structural diagram of a resource download apparatus according to an embodiment of this application.

FIG. 17 is a schematic structural diagram of a resource download apparatus according to an embodiment of this application. As shown in FIG. 17, the apparatus includes a determining module 1701, a download module 1702, and a sending module 1703.

The determining module 1701 is configured to determine a target resource. The target resource is divided into one or more first resource pieces, and each first resource piece is divided into one or more second resource pieces.

The download module 1702 is configured to in a download process, for any first resource piece in the target resource, download one or more second resource pieces in the first resource piece according to a BT rule.

The sending module 1703 is configured to, when finishing downloading the one or more second resource pieces, send the one or more second resource pieces to a service processing module in turn according to an arrangement sequence of the one or more second resource pieces in the target resource.

The download module 1702 is further configured to continue to download a next first resource piece of the first resource piece in the target resource until the target resource is completely downloaded.

Optionally, a topology structure of a P2P network is a mesh structure. Any link in the mesh structure is used to bidirectionally transmit a resource.

It should be noted that when the resource download apparatus provided in this embodiment downloads a resource, only division of the foregoing function modules is used as an example for description. In actual application, the foregoing functions may be allocated, as required, to be completed by different function modules. That is, an internal structure of a first node is divided into different function modules to complete all or some of the described functions. In addition, the resource download apparatus provided in this embodiment and the resource download method embodiment belong to a same concept. For a specific implementation process of the apparatus, refer to the method embodiment. Details are not described herein again.

Figure 18:
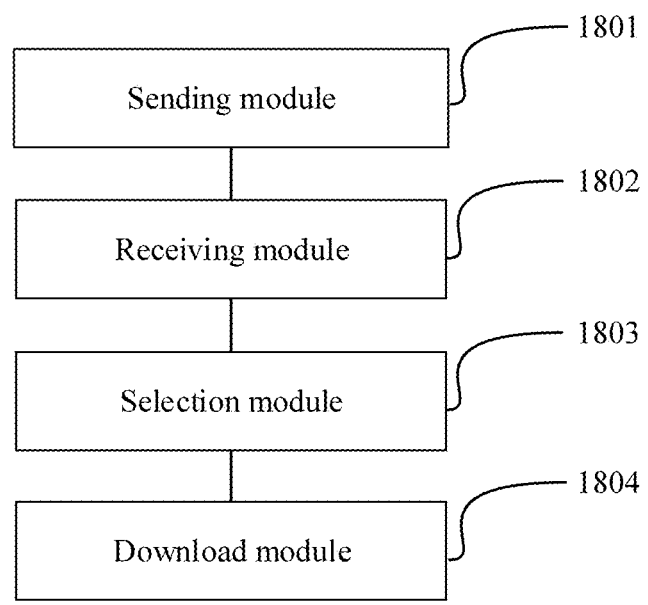
FIG. 18 is a schematic structural diagram of a resource download apparatus according to an embodiment of this application.

FIG. 18 is a schematic structural diagram of a resource download apparatus according to an embodiment of this application. As shown in FIG. 18, the apparatus includes a sending module 1801, a receiving module 1802, a selection module 1803, and a download module 1804.

The sending module 1801 is configured to send IaaS feature information, of the first node, in a cloud computing service to a tracking node in a P2P P2P network.

The receiving module 1802 is configured to receive peer node information of the P2P network from the tracking node. The peer node information includes one or more node identifiers. one or more priorities of the one or more node identifiers corresponds or correspond to a matching degree between a corresponding node and the IaaS feature information of the first node.

The selection module 1803 is configured to select one or more second nodes in the P2P network based on the peer node information.

The download module 1804 is configured to download a target resource from the one or more second nodes.

Optionally, the selection module 1803 is configured to determine a first type of node as the one or more second nodes based on the peer node information, where the first type of node and the first node are located on a same host machine, and/or determine a second type of node as the one or more second nodes based on the peer node information, where the second type of node and the first node are located on a same rack, and/or determine a third type of node as the one or more second nodes based on the peer node information, where the third type of node and the first node are located in a same equipment room, and/or determine a fourth type of node as the one or more second nodes based on the peer node information, where the fourth type of node and the first node are located in a same region.

Optionally, an identifier, of the first type of node, in the peer node information has a first priority, and the first type of node and the first node are located on the same host machine, and/or an identifier, of the second type of node, in the peer node information has a second priority, and the second type of node and the first node are located on the same rack, and/or an identifier, of the third type of node, in the peer node information has a third priority, and the third type of node and the first node are located in the same equipment room, and/or an identifier, of the fourth type of node, in the peer node information has a fourth priority, and the fourth type of node and the first node are in the same region.

The first priority, the second priority, the third priority, and the fourth priority are used to indicate a priority of selecting the corresponding node by the first node. The first priority, the second priority, the third priority, and the fourth priority are sorted in descending order.

Figure 19:
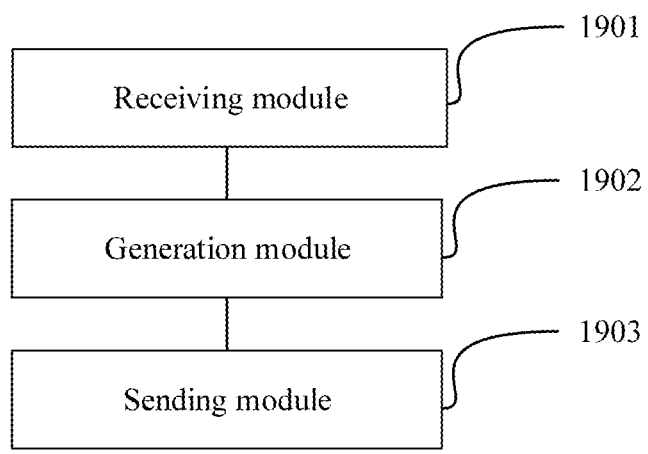
FIG. 19 is a schematic structural diagram of a resource download apparatus according to an embodiment of this application.

FIG. 19 is a schematic structural diagram of a resource download apparatus according to an embodiment of this application. As shown in FIG. 19, the apparatus includes a receiving module 1901, a generation module 1902, and a sending module 1903.

The receiving module 1901 is configured to receive IaaS feature information, of a first node in a P2P network, in a cloud computing service.

The generation module 1902 is configured to generate peer node information based on a matching degree between IaaS feature information of each node in the P2P network and the IaaS feature information of the first node. The peer node information includes one or more node identifiers, and an arrangement sequence of the one or more node identifiers corresponds to the matching degree.

The sending module 1903 is configured to send the peer node information to the first node.

Optionally, an identifier, of the first type of node, in the peer node information has a first priority, and the first type of node and the first node are located on the same host machine, and/or an identifier, of the second type of node, in the peer node information has a second priority, and the second type of node and the first node are located on the same rack, and/or an identifier, of the third type of node, in the peer node information has a third priority, and the third type of node and the first node are located in the same equipment room, and/or an identifier, of the fourth type of node, in the peer node information has a fourth priority, and the fourth type of node and the first node are in the same region.

The first priority, the second priority, the third priority, and the fourth priority are used to indicate a priority of selecting the corresponding node by the first node. The first priority, the second priority, the third priority, and the fourth priority are sorted in descending order.

It should be noted that when the resource download apparatus provided in this embodiment downloads a resource, only division of the foregoing function modules is used as an example for description. In actual application, the foregoing functions may be allocated, as required, to be completed by different function modules. That is, an internal structure of the first node is divided into different function modules to complete all or some of the described functions. In addition, the resource download apparatus provided in this embodiment and the resource download method embodiment belong to a same concept. For a specific implementation process of the apparatus, refer to the method embodiment. Details are not described herein again.

All the foregoing optional technical solutions may be randomly combined to form optional embodiments of this application. Details are not described herein again.

All or some of the foregoing embodiments may be implemented using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center wired or wirelessly. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

The term "and/or" in this application describes only an association relationship for describing associated objects and represents there may be three relationships. For example, "A and/or B" may represent the following three cases: only A exists, both A and B exist, and only B exists. In addition, the character "/" in this application usually indicates an "or" relationship between the associated objects.

In this application, the term "a plurality of" means two or more. For example, a plurality of data packets are two or more data packets.

In this application, terms such as "first" and "second" are used to distinguish between same items or similar items that have basically same functions. A person skilled in the art may understand that the terms such as "first" and "second" do not limit a quantity and an execution sequence.

The foregoing descriptions are merely optional embodiments of this application, but are not intended to limit this application. Any variation or replacement readily figured out by a person skilled in the art within the technical scope disclosed in this application shall fall within the protection scope of this application.

What is claimed is:

1. A resource obtaining method implemented by a first node, comprising:
   receiving a plurality of first data packets from a plurality of second nodes, wherein the first data packets are based on a plurality of first resource pieces of a target resource that is encrypted using a public key in a first key pair, wherein the first key pair encrypts the target resource between the first node and the second nodes in a peer-to-peer (P2P) network, wherein the first key pair comprises the public key and a private key, wherein the first key pair uniquely corresponds to the target resource, and wherein the private key is configured to decrypt the target resource and cannot decrypt resources other than the target resource;
   decrypting the first data packets using the private key to obtain a plurality of resource pieces of the target resource;
   determining the target resource based on the resource pieces, wherein the target resource comprises the first resource pieces, and wherein each of the first resource pieces comprises a plurality of second resource pieces;
   downloading, in a download process and for one of the first resource pieces, the second resource pieces in the one of the first resource pieces according to a bit torrent (BT) rule;
   sending the second resource pieces in the one of the first resource pieces to a service processor in turn according to an arrangement sequence of the second resource pieces in the target resource when finishing downloading the second resource pieces in the one of the first resource pieces; and
   continuing to download a next first resource piece of the first resource pieces until the target resource is completely downloaded.

2. The resource obtaining method of claim 1, wherein the first key pair encrypts a plurality of links for transmitting the target resource in the P2P network, wherein the links are between the first node and the second nodes, and wherein the resource obtaining method further comprises:
   receiving a data packet over a link of the links; and
   decrypting the data packet using the private key.

3. The resource obtaining method of claim 1, wherein before receiving the first data packets, the resource obtaining method further comprises:
   generating, for one of the second nodes, an obtaining request for the target resource;
   encrypting the obtaining request using the public key to obtain a second data packet; and
   sending the second data packet to the one of the second nodes.

4. The resource obtaining method of claim 1, further comprising obtaining a second key pair corresponding to the target resource.

5. The resource obtaining method of claim 4, further comprising either:
   receiving a third key pair of a tracking node in the P2P network; or
   receiving a digital certificate of the tracking node, wherein the digital certificate carries an identifier of the target resource, and generating a fourth key pair based on the digital certificate.

6. The resource obtaining method of claim 1, wherein before receiving the first data packets, the resource obtaining method further comprises sending token data of an authentication node to the second nodes, and wherein the token data indicates that the first node has a permission to obtain the target resource.

7. The resource obtaining method of claim 6, wherein the token data comprises a permission identifier, wherein the permission identifier indicates a permission of the first node on the target resource, and wherein the permission comprises permission for obtaining the target resource.

8. The resource obtaining method of claim 1, wherein the target resource is an image layer.

9. A computer device comprising:
   a memory configured to store instructions; and
   a processor coupled to the memory, wherein the instructions cause the processor to be configured to:
     receive first data packets from a plurality of second nodes, wherein the first data packets are based on a plurality of first resource pieces of a target resource that is encrypted using a public key in a first key pair, wherein the first key pair encrypts the target resource between a first node and the second nodes in a peer-to-peer (P2P) network, wherein the first key pair comprises the public key and a private key, wherein the first key pair uniquely corresponds to the target resource, and wherein the private key is configured to decrypt the target resource and cannot decrypt resources other than the target resource;
     decrypt the first data packets using the private key to obtain a plurality of resource pieces of the target resource;
     determine the target resource based on the resource pieces, wherein the target resource comprises the first resource pieces, and wherein each of the first resource pieces comprises a plurality of second resource pieces;

download, in a download process and for one of the first resource pieces, the second resource pieces in the one of the first resource pieces according to a bit torrent (BT) rule;

send the second resource pieces in the one of the first resource pieces to a service processor in turn according to an arrangement sequence of the second resource pieces in the target resource when finishing downloading the second resource pieces in the one of the first resource pieces; and continue to download a next first resource piece of the first resource pieces until the target resource is completely downloaded.

10. The computer device of claim 9, wherein the first key pair encrypts a plurality of links for transmitting the target resource in the P2P network, wherein the links are between the first node and the second nodes, and wherein the instructions further cause the processor to be configured to:

receive a data packet over a link of the links; and decrypt the data packet using the private key.

11. The computer device of claim 9, wherein the instructions further cause the processor to be configured to:

generate, for one of the second nodes, an obtaining request for the target resource;

encrypt the obtaining request using the public key to obtain a second data packet; and send the second data packet to the one of the second nodes.

12. The computer device of claim 9, wherein the instructions further cause the processor to be configured to obtain a second key pair corresponding to the target resource.

13. A resource obtaining method implemented by a first node, comprising:

receiving a plurality of first data packets from a plurality of second nodes, wherein the first data packets are based on a first resource piece of a target resource that is encrypted using a public key in a first key pair, wherein the first key pair encrypts the target resource between the first node and the second nodes in a peer-to-peer (P2P) network, wherein the first key pair comprises the public key and a private key, wherein the first key pair uniquely corresponds to the target resource, and wherein the private key is configured to decrypt the target resource and cannot decrypt resources other than the target resource;

decrypting the first data packets using the private key to obtain a plurality of resource pieces of the target resource;

determining the target resource based on the resource pieces;

sending infrastructure as a service (IaaS) feature information of the first node in a cloud computing service to a tracking node in the P2P network;

receiving peer node information of the P2P network from the tracking node, wherein the peer node information comprises a plurality of node identifiers, and wherein a plurality of priorities of the node identifiers in the peer node information correspond to a matching degree between a corresponding node and the IaaS feature information of the first node;

selecting the second nodes in the P2P network based on the peer node information; and downloading the target resource from the second nodes that are selected.

14. The resource obtaining method of claim 13, wherein the first key pair encrypts a plurality of links for transmitting the target resource in the P2P network, wherein the links are between the first node and the second nodes, and wherein the resource obtaining method further comprises:

receiving a data packet over a link of the links; and decrypting the data packet using the private key.

15. The resource obtaining method of claim 13, wherein before receiving the first data packets, the resource obtaining method further comprises:

generating, for one of the second nodes, an obtaining request for the target resource;

encrypting the obtaining request using the public key to obtain a second data packet; and sending the second data packet to the one of the second nodes.

16. The resource obtaining method of claim 13, further comprising obtaining a second key pair corresponding to the target resource.

17. A computer device comprising:

a memory configured to store instructions; and a processor coupled to the memory, wherein the instructions cause the processor to be configured to:

receive first data packets from a plurality of second nodes, wherein the first data packets are based on a first resource piece of a target resource that is encrypted using a public key in a first key pair, wherein the first key pair encrypts the target resource between a first node and the second nodes in a peer-to-peer (P2P) network, wherein the first key pair comprises the public key and a private key, wherein the first key pair uniquely corresponds to the target resource, and wherein the private key is configured to decrypt the target resource and cannot decrypt resources other than the target resource;

decrypt the first data packets using the private key to obtain a plurality of resource pieces of the target resource;

determine the target resource based on the resource pieces;

send infrastructure as a service (IaaS) feature information of the first node in a cloud computing service to a tracking node in the P2P network;

receive peer node information of the P2P network from the tracking node, wherein the peer node information comprises a plurality of node identifiers, and wherein a plurality of priorities of the node identifiers in the peer node information correspond to a matching degree between a corresponding node and the IaaS feature information of the first node;

select the second nodes in the P2P network based on the peer node information; and download the target resource from the second nodes that are selected.

18. The computer device of claim 17, wherein the first key pair encrypts a plurality of links for transmitting the target resource in the P2P network, wherein the links are between the first node and the second nodes, and wherein the instructions further cause the processor to be configured to:

receive a data packet over a link of the links; and decrypt the data packet using the private key.

19. The computer device of claim 17, wherein the instructions further cause the processor to be configured to:

generate, for one of the second nodes, an obtaining request for the target resource;

encrypt the obtaining request using the public key to obtain a second data packet; and send the second data packet to the one of the second nodes.

20. The computer device of claim 17, wherein the instructions further cause the processor to be configured to obtain a second key pair corresponding to the target resource.

\* \* \* \* \*